US009917886B2

(12) United States Patent
Sentinelli et al.

(10) Patent No.: US 9,917,886 B2
(45) Date of Patent: Mar. 13, 2018

(54) METHOD FOR DISTRIBUTING INFORMATION CONTENTS, CORRESPONDING DEVICE AND COMPUTER PROGRAM PRODUCT

(71) Applicant: STMicroelectronics S.r.l., Agrate Brianza (IT)

(72) Inventors: Alexandro Sentinelli, Milan (IT); Andrea Lorenzo Vitali, Santa Clara, CA (US); Allan Taschini, Bergamo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 828 days.

(21) Appl. No.: 14/222,770

(22) Filed: Mar. 24, 2014

(65) Prior Publication Data
US 2014/0289363 A1 Sep. 25, 2014

(30) Foreign Application Priority Data
Mar. 22, 2013 (IT) .............................. TO2013A0230

(51) Int. Cl.
*H04L 29/08* (2006.01)
*H04L 1/00* (2006.01)

(52) U.S. Cl.
CPC ................ *H04L 67/10* (2013.01); *H04L 1/00* (2013.01); *H04L 67/108* (2013.01)

(58) Field of Classification Search
None
See application file for complete search history.

(56) References Cited

U.S. PATENT DOCUMENTS

| 5,912,921 | A | * | 6/1999 | Warren | ...................... | H04L 1/00 370/332 |
| 2009/0006919 | A1 | * | 1/2009 | Xu | ............................ | H04L 1/00 714/747 |

(Continued)

OTHER PUBLICATIONS

Enrique Costa-Montenegro et al: "Analysis of the BitTorrent Protocol Modified with Founta in Code", 2012 Seventh International Conference on P2P, Parallel, Grid, Cloud and Internet Computing (3PGCIC), IEEE, Nov. 12, 2012, Victoria, BC, Canada, pp. 33-40.*

(Continued)

*Primary Examiner* — Larry Donaghue
(74) *Attorney, Agent, or Firm* — Seed IP Law Group LLP

(57) ABSTRACT

In an embodiment, information contents, such as, e.g., media contents arranged in pieces including blocks of bits, is distributed over a network including plural terminals at least one of which acts as a source of the pieces of information distributed. Various terminals in the network are configured to act as peer terminals with at least one first peer terminal sending the information to one or more second peer terminals. A set of blocks of a corresponding piece of information is received at the first peer terminal and the corresponding piece of information is reconstructed from the set of blocks received. The pieces of information distributed over the network are fountain encoded by XOR-ing the blocks in a piece, so that a received piece is reconstructable from a combination of a corresponding set of linearly independent XOR-ed blocks. The first peer terminal may start sending to the second peer terminal(s) blocks it is receiving before the corresponding piece of information is reconstructed and possibly subjected to integrity check at the first terminal. Fountain encoding the pieces of information is by means of plural sets of linearly independent XOR-ed blocks. A same piece of information is distributed to a plurality of peer terminals by sending thereto different sets of linearly inde- (Continued)

pendent XOR-ed blocks, thus avoiding undue redundancy in the information further propagated to other peers.

14 Claims, 15 Drawing Sheets

(56) References Cited

U.S. PATENT DOCUMENTS

| | | | | |
|---|---|---|---|---|
| 2010/0322171 A1* | 12/2010 | Dekorsy | ............. | H04B 7/0621 370/329 |
| 2011/0161457 A1* | 6/2011 | Sentinelli | ............. | H04L 1/0045 709/217 |
| 2011/0161668 A1* | 6/2011 | Sentinelli | ............. | H04L 67/104 713/168 |
| 2011/0225451 A1* | 9/2011 | Leggette | ............. | G06F 12/1425 714/6.22 |
| 2011/0282989 A1* | 11/2011 | Geirhofer | ............. | H04W 28/18 709/224 |
| 2013/0114571 A1* | 5/2013 | Das | ............. | H04W 24/10 370/336 |
| 2013/0198151 A1* | 8/2013 | Sentinelli | ............. | H04L 67/108 707/693 |
| 2014/0289363 A1* | 9/2014 | Sentinelli | ............. | H04L 1/00 709/217 |

OTHER PUBLICATIONS

Spoto et al., BitTorrent and fountain codes: friends or foes? pp. 1-8, 2010.*

Search Report for Italian patent application No. TO20130230; Munich, Germany, dated Nov. 15, 2013, 2 pages.

Marfia G et al: "Digital Fountains + P2P for Future IPTV Platforms: A Test-Bed Evaluation", 2011 4th IFIP International Conference on New Technologies, Mobility and Security (NTMS), IEEE, Feb. 7, 2011, Paris, France, pp. 1-5.

A. Sentinelli et al.: "A Survey on P2P Overlay Streaming Clients", Towards the Future Internet—A European Research Perspective, 2009 IOS press, ISBN 978-1-60750-007-0, Amsterdam, Netherlands, pp. 273-282.

http://en.wikipedia.org/wiki/Network_coding, "Linear network coding", weblink accessed on Mar. 20, 2014, 5 pages.

www.octoshape.com; Octoshape; weblink accessed on Mar. 21, 2014, 2 pages.

http://www.octoshape.com/?page=company/partners; weblink accessed on Mar. 21, 2014, 1 page.

* cited by examiner

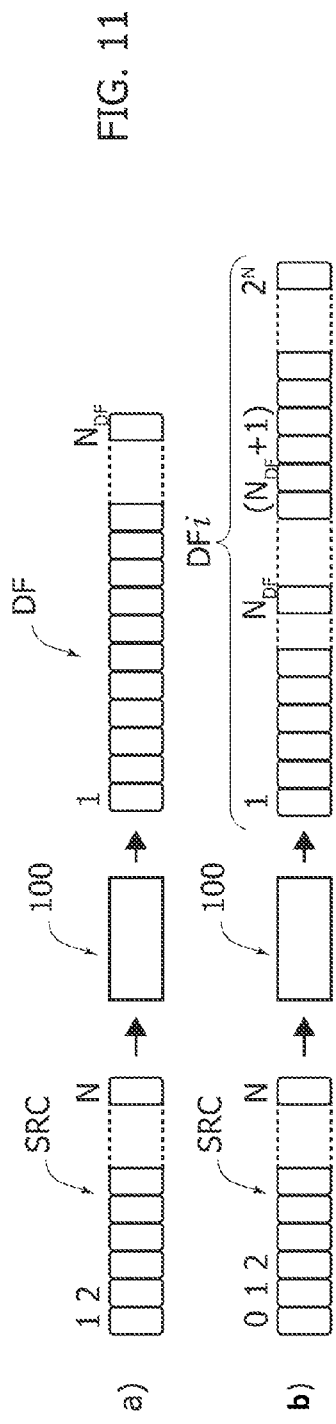
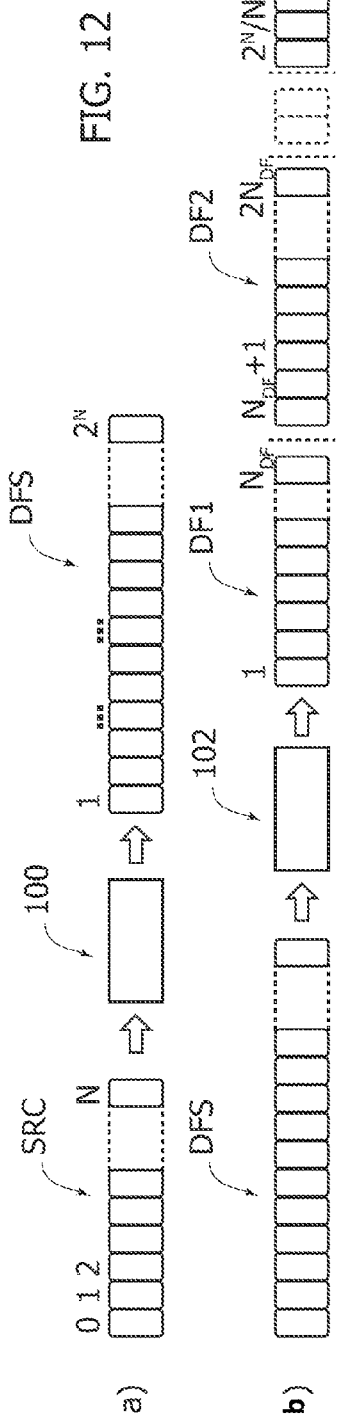
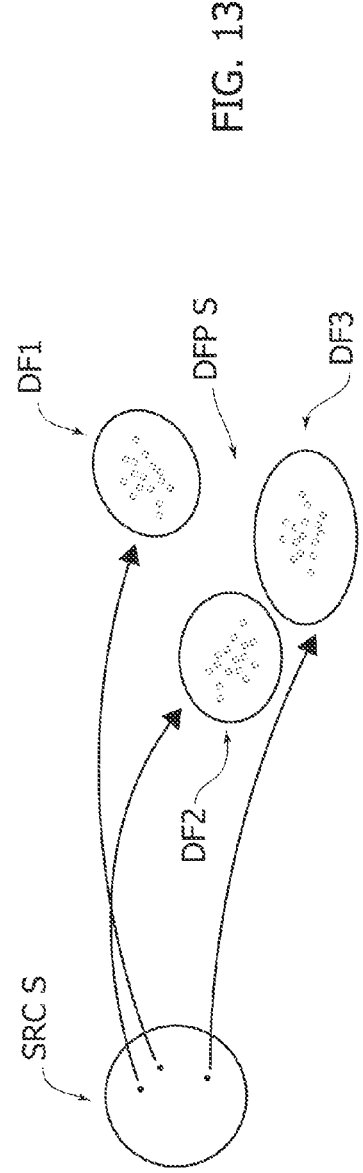
FIG. 11
FIG. 12
FIG. 13

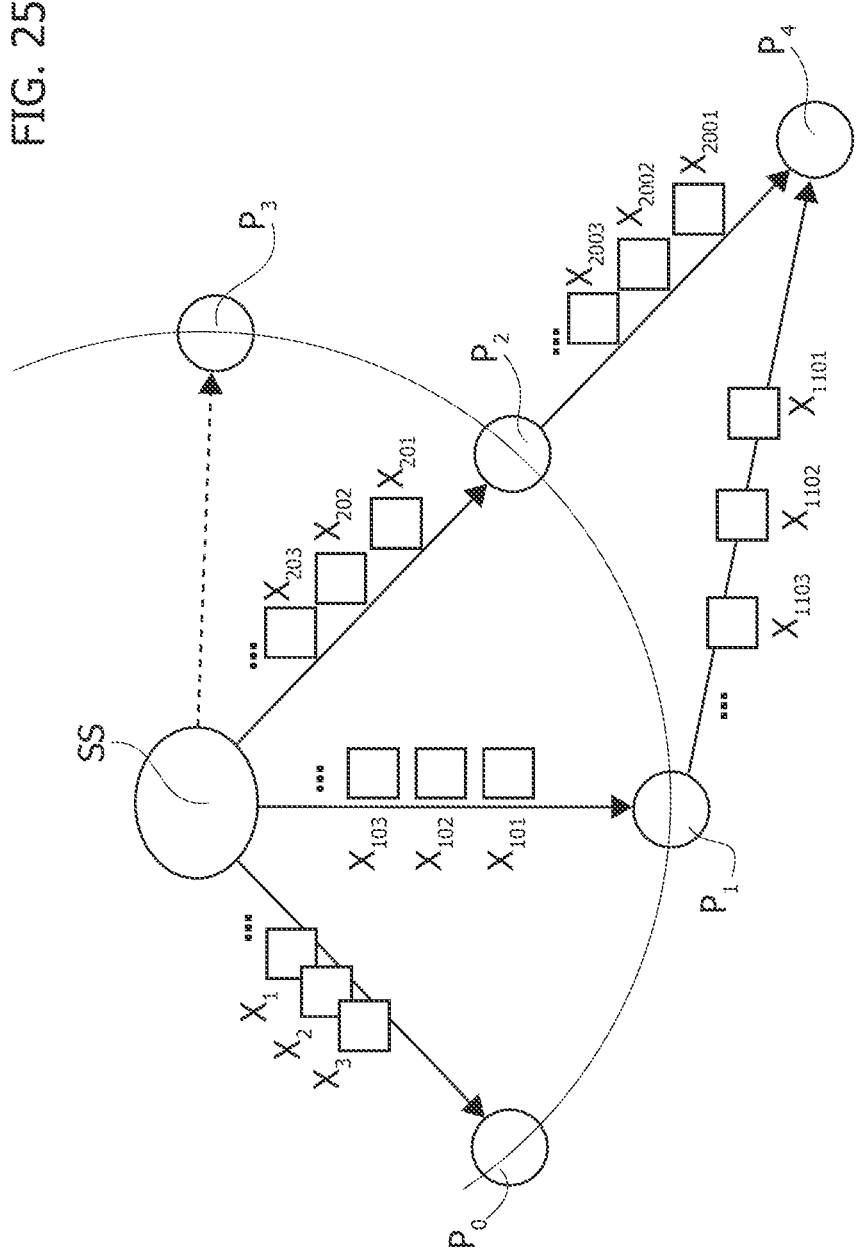

METHOD FOR DISTRIBUTING INFORMATION CONTENTS, CORRESPONDING DEVICE AND COMPUTER PROGRAM PRODUCT

PRIORITY CLAIM

The instant application claims priority to Italian Patent Application No. TO2013A000230, filed 22 Mar. 2013, which application is incorporated herein by reference in its entirety.

TECHNICAL FIELD

This disclosure relates to techniques for distributing information contents.

Various embodiments may apply to so-called cooperative networks such as, e.g., Peer-to-Peer networks for distributing media contents.

SUMMARY

Peer-to-Peer (P2P) networks are an environment created at the application layer by a local software application. The application can communicate with other users in the network running the same software and create an overlay network at the application layer where each end user may share his/her own contents and resources with the "peers" in the whole overlay.

The related Wikipedia™ entry available on the Internet at http://en.wikipedia.org/wiki/Network_coding, and articles such as:

A. Sentinelli et al.: "*A Survey on P2P Overlay Streaming Clients*", IOS press "Towards the Future Internet—A European Research Perspective," 2009, ISBN 978-1-60750-007-0 pp. 273-282;

G. Marfia et al.: "Digital Fountains+P2P for Future IPTV Platforms: A Testbed Evaluation," in Proc. 4th IEEE/IFIP International Conference on New Technologies, Mobility and Security, Paris, 2011, pp. 1-5, which are incorporated by reference, provide technical background information in this area.

Commercial products such as the Octoshape™ content distribution network (CDN) (see, e.g., www.octoshape.com. and http://www.octoshape.com/?page=company/partners, which are incorporated by reference) propose a compromise between the bandwidth cost savings expected from P2P exploitation and reliability measured against 100% Quality of Service (QoS).

US 2011/0161457, which is incorporated by reference, discloses a network, such as a Peer-to-Peer overlay network, including a set of peer terminals wherein information codes are arranged in pieces comprised of chunks of bytes. A first peer identifies missing chunks in the received pieces and requests such missing chunks from other peers. The chunks are subjected to a fountain-code encoding wherein the chunks in a piece are X-ORed. The first peer is, therefore, capable of reconstructing a received piece encoded with fountain codes from a combination of linearly independent chunks corresponding to the piece. The chunks are transmitted over the network with a connectionless protocol, without retransmission of lost packets, for example, with a UDP. Embodiments of such an arrangement may combine the use of a Unit Data Protocol (UDP) for content delivery in cooperative networks (e.g., in a P2P file-sharing application that distributes block units encoded with a so-called Digital Fountain—DF) with the capability of supporting a system architecture with a higher degree of complexity in comparison to solutions involving single algorithms.

Various modules possibly included in such systems may benefit from further investigation and improvement. This may apply, for instance, to arrangements adapted to change the behavior of the peers in the network "on-the-field", that is during actual network operation, and/or to performance of a P2P protocol for content delivery when evaluated by using download time as a metric: the shorter the download time, the better the protocol.

Embodiments herein may improve the capabilities of conventional arrangements as discussed in the foregoing.

Various embodiments include a method, and may also relate to corresponding devices (e.g., network terminals) as well as to a computer program product, loadable into the memory of at least one computer (e.g., a terminal in a network), and comprising software-code portions adapted to perform the steps of the method when the product is run on at least one computer. As used herein, such a computer-program product is intended to be equivalent to a computer-readable medium containing instructions for the control of the computing system, so as to coordinate the execution of a method according to an embodiment. The reference to "at least one computer" is meant to highlight the possibility for an embodiment to be implemented in a modular and/or distributed form.

Various embodiments may provide a judicious balance of security constraints and reduced download time, with, e.g., hash-integrity checks delayed or possibly skipped. Various embodiments may thus provide the capability of speeding up the data-sharing mechanism by delaying data-integrity checks at the piece level, while also tackling the issue of possible redundancy of the blocks delivered in the network. Various embodiments may overcome performance bottlenecks associated with a constrained piece/block approach whereby, if a piece has not been fully downloaded and verified through, e.g., a hash-integrity check, it cannot be shared with other peers. In various embodiments, blocks may be shared before piece validation, which may lead to improvements in exploiting the upload bandwidth, while also dealing with the possibility that certain peers may distribute redundant blocks.

Various embodiments may speed up sharing of blocks by diversifying as much as possible the information distributed in the network. Various embodiments may provide a protocol for content delivery in cooperative networks (e.g., P2P networks), which protocol exploits information diversity among the blocks distributed in the network. Various embodiments may provide a P2P network system that maximizes, or approximately maximizes, information diversity among the blocks in the network by exploiting a Digital Fountain mechanism and ad-hoc changes in a protocol.

Various embodiments may be based on a development of the BitFountain (BF) approach of US 2011/0161457, which is incorporated by reference, which approach may be defined as a BitFountain Delivery Remap (BFDR) mechanism. Various embodiments may provide a P2P system based on the BFDR concept by means of a protocol for, e.g., streaming applications which enhances the diversity of the data blocks (e.g., Digital Fountain—DF blocks) shared in a network.

Various embodiments may provide alternative solutions to conventional BitTorrent (BT) or Torrent-like arrangements. Various embodiments may provide improved performance over BT both for large piece size and for smaller (and more traditional) piece size.

Various embodiments may provide a Peer-to-Peer (P2P) system where a Digital Fountain (DF) and a UDP are used in, e.g., P2P file sharing at the application layer and the transport layer, respectively. Various embodiments may address issues related to, e.g., protocol design in terms of headers and encoding rules in data-block generation.

Various embodiments are suitable for use in a planetary environment including, e.g., hundreds of nodes. Various embodiments may cover scenarios with more than one seed supplier peer, including CDNs with servers that deliver the same content, while complying with inherent constraints and ensuring diversity in data generation.

BRIEF DESCRIPTION OF THE DRAWINGS

Various embodiments will now be described, by way of example only, with reference to the annexed figures, wherein:

FIGS. 11 and 12, each including two portions designated a) and b), are exemplary of block generation in a digital fountain.

FIG. 13 exemplifies a digital-fountain-piece-space representation.

FIG. 25 is exemplary of bit-fountain-delivery remapping in embodiments.

DETAILED DESCRIPTION

Figure 1:
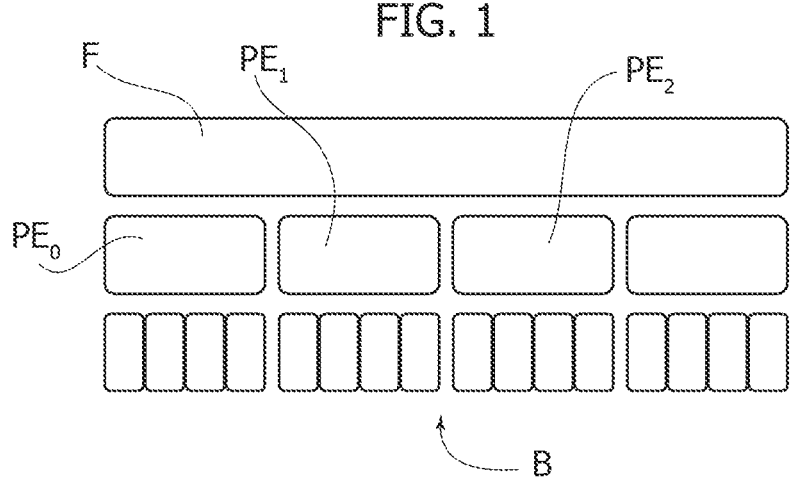
FIG. 1 is exemplary of a file-piece-block information structure.

The following table lists a number of acronyms that may be used throughout this description along with their meaning.

| | |
|---|---|
| BF | Bit Fountain |
| BFDR | Bit Fountain Delivery Remap |
| DF | Digital Fountain |
| P2P | Peer To Peer |
| STB | Set Top Box |
| TCP | Transport Control Protocol |
| UDP | Unit Data Protocol |

In the following description, numerous specific details are given to provide a thorough understanding of exemplary embodiments. The embodiments can be practiced without one or more of the specific details, or with other methods, components, materials, etc. In other instances, well-known structures, materials, or operations are not shown or described in detail to avoid obscuring aspects of the embodiments. Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings and references provided herein are for the convenience of the reader only and do not interpret the scope or meaning of the embodiments.

Current file-sharing applications may perform an integrity check after a full piece (or chunk) of a file has been downloaded; an established appreciation in P2P technology thus suggests that smaller pieces may lead to better performance.

It was noted that an element in that context may lie in data integrity being checked after a full piece has been downloaded. A basic assumption in BitTorrent policy dictates that it is not permitted to upload blocks, i.e., to share them with other peers, until the full piece has been downloaded and validated. In fact, blocks are the data units exchanged among the peers, and blocks represent the smaller unit components of pieces.

Various embodiments herein may be able to exchange Digital Fountain (DF) X-ORed blocks even if the piece is not yet fully downloaded. This by also noting that, if peers transmit block units as soon as they receive them, the improvement in resource exploitation due to immediate sharing may be at least partly canceled out by redundant information being undesirably produced in the network. This may possibly be the case even if blocks are shared through a pseudo-random combination of blocks that starts from one seed, which is the same for the whole P2P network, and proceeds through a "pseudo-random" extraction of the indexes that refer to the blocks which are XORed. It may be noted that the issue of redundancy is not addressed in US 2001/0161457, which is incorporated by reference.

In order to avoid uploading redundant information, various embodiments may implement a policy which aims at maximizing information diversity of the block combinations at each peer of the network without generating further overhead information.

In various embodiments, the download process may be speeded up by exploiting free upload resources from the very beginning of the download process. Diversity as offered by a Digital Fountain (DF) during the generation of data blocks may be exploited in order to avoid that early sharing may produce redundancy among blocks (i.e., that one peer might receive the very same blocks from two different suppliers), while changes in the protocol headers may avoid redundancy loops.

Various embodiments may be based on remapping Digital Fountain (DF) block generation for the various peers in order to maximize the information diversity in the whole network swarm.

FIG. 1 is exemplary of a file-piece-block information structure as used in cooperative networks (e.g., P2P) both in BT and BF (e.g., US 2011/0161457, which is incorporated by reference).

In such embodiments, the content to be delivered over the network is organized as files F, pieces PE (sometimes referred to also as "chunks") and blocks B.

A file F is made of pieces (e.g., $PE_0$, $PE_1$, $PE_2$, ...) and a piece $PE_i$ is made of blocks B. The block B is the atom unit for content delivery over a cooperative network (e.g., P2P).

A basic rationale of operation of such a network may be as follows:

I (a node in the network) am missing a piece of the file→I ask for that piece

I ask for a piece→I receive blocks of that piece.

I am asked for one piece→I send blocks of that piece.

A P2P network may include peers, seeds, and a tracker.

A seed is a terminal or "node" in the network that holds the whole file. A seed may be assumed only to supply contents, without ever asking for any contents for downloading.

A peer is a node or client in the network that has some piece (or chunk) of the file but not the whole file. A peer may hold some pieces that have been validated, e.g., via a hash integrity check, and those pieces can be shared over the network with other peers: the (first) peer acts as a supplier to the other peers because it supplies information; in conventional BT, such a peer cannot share pieces that have been (only) partially downloaded.

A tracker is an entity, usually hosted by a reachable server, that updates the list of peers and seeds with respect to a certain file.

A process considered herein may include a check such as a hash check (or piece signature, or data integrity check). In fact, malicious peers may manipulate the content of a block; a mechanism may thus exist at the piece level in order to validate data integrity and prevent error propagation towards the rest of the peer population.

Joining a P2P "swarm" may involve downloading a "Torrent" file (a few Kb) containing all the hash codes (or the signatures) of the pieces in that file. Therefore, when reception of the blocks of a specific piece $PE_i$ has been completed, a hash may be computed and compared with an "unofficial" hash corresponding to $PE_i$, which is written in the Torrent file.

Comparison between the two hash codes may yield two outcomes:

the hash codes are not equal: integrity of the data in that piece is negated-->the piece is discarded;

the hash codes are equal: data integrity of that piece is confirmed and the piece can be shared with the rest of the network.

In such an arrangement, the piece and/or the blocks of the piece can be shared (=uploaded) only after piece validation.

Figure 2:
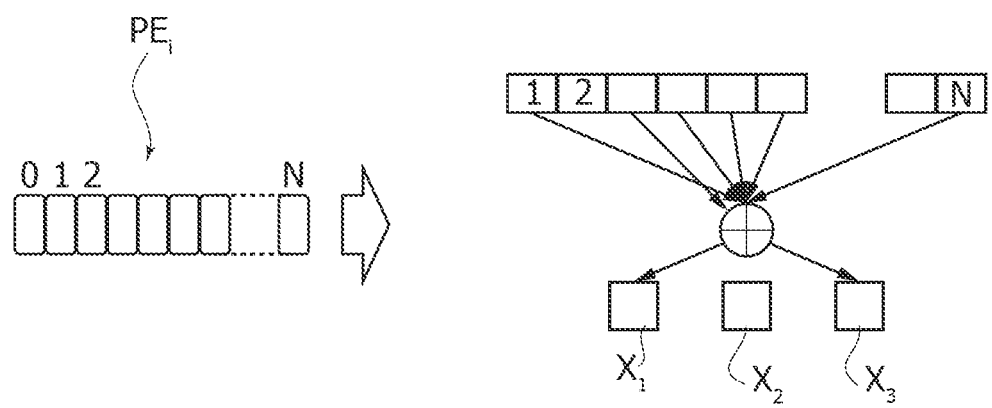
FIG. 2 is exemplary of XOR combinations in a Digital Fountain (DF).

The Digital Fountain (DF) mechanism of, e.g., US 2011/0161457, which is incorporated by reference, may involve an XOR sum of blocks: one piece is made by a fixed number of blocks B (configurable by the user) that may be encoded through the DF. FIG. 2 shows how new blocks of distributed information, denoted $X_1, X_2, X_3, \ldots$ can be produced from the blocks B of an original piece $PE_i$ through simple XOR combinations. In Bit Fountain (BF), a piece may be "decodable" (i.e., "reconstructable", that is adapted to be reconstructed) only when a sufficient number of (linearly independent) encoded blocks have been received: from a set of N blocks there may be $2^N$ different XOR combinations but only N independent blocks may be necessary to decode one block.

Figure 3:
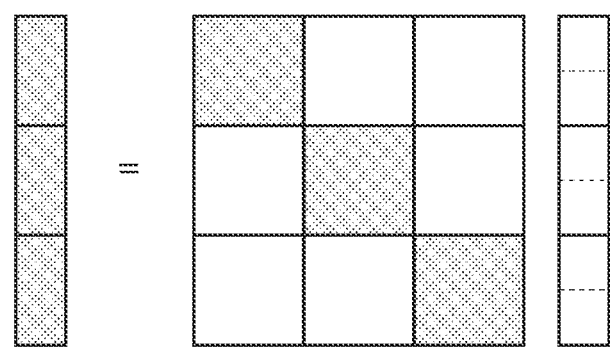
FIG. 3 is exemplary of a coding matrix.

An exemplary coding matrix DFM for a file made of three pieces may be as shown in FIG. 3; such a matrix mixes three blocks from a file through XOR operations to produce a new DF block over which the information is distributed. When that block (shown on the left) becomes sufficiently "large" (i.e., "at least N independent blocks"), the matrix can decode the information, i.e., reconstruct the piece from the corresponding set of blocks B.

Figure 4:
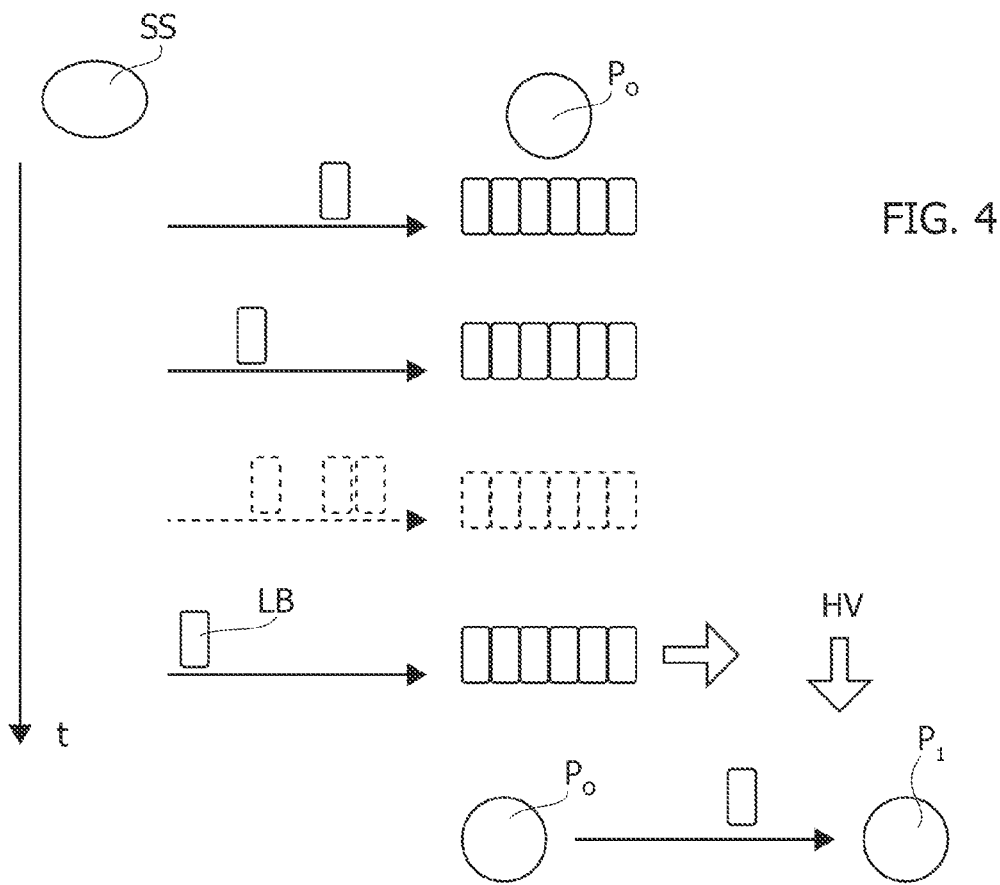
FIGS. 4 and 5 are exemplary of block sharing in a cooperative network.

In BT, as in a BF implementation, a piece may be reconstructed, and thus shared, only after the hash integrity check. Such an approach is schematically represented in FIG. 4, where a node $P_0$ is shown receiving blocks from a seed supplier SS, and only after receiving a last block LB and performing successful validation, e.g., Hash Verification HV of the (fully downloaded) piece, the node $P_0$ starts sending the blocks to another node $P_1$.

Figure 5:
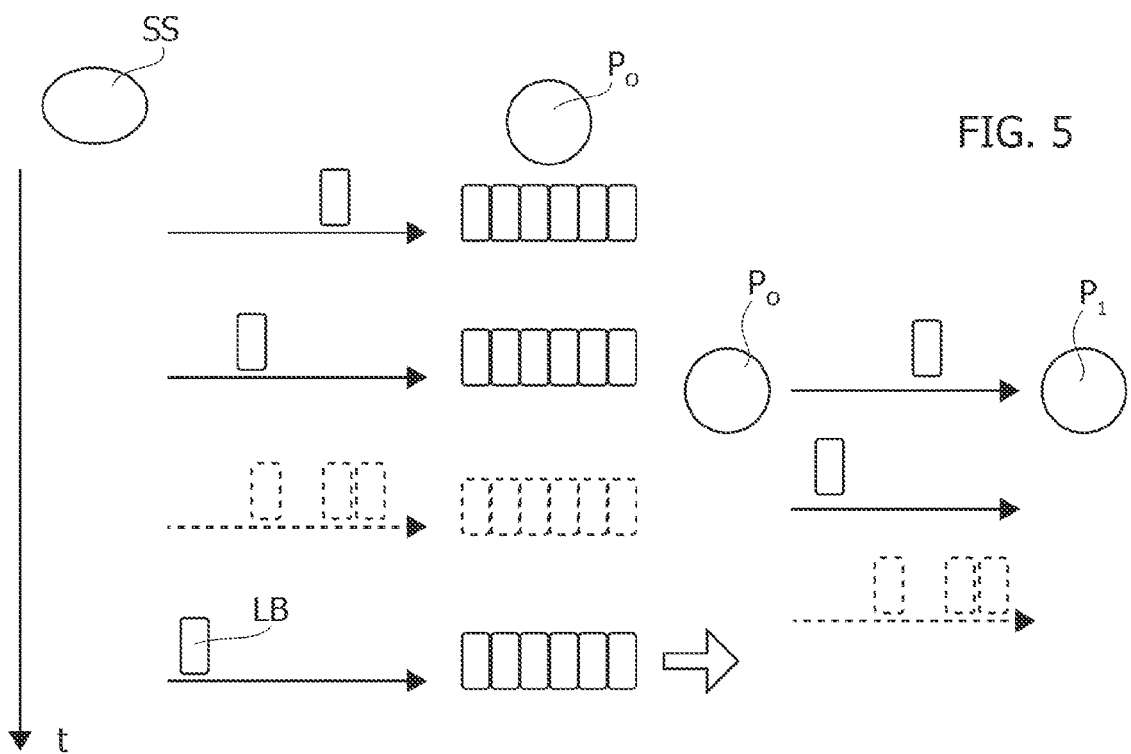

FIG. 5 is exemplary of an approach where a node $P_0$ receiving blocks from a seed supplier SS starts sending the blocks to another node $P_1$ without waiting for data-integrity validation, that is, before the piece becomes "reconstructable" by fully downloading the set of blocks received from the seed supplier SS and corresponding to the piece.

Various embodiments of such an approach may thus involve relaxing the security checks in order to improve the overall performance of the system by better exploiting the overall upload resources, making upload faster by reducing the average download time at the peer.

Various embodiments may thus involve a change in the local protocol so that blocks start to be shared before performing the data-integrity check (e.g., hash check).

In various embodiments, this may lead to the integrity check being delayed, while not necessarily dispensed with, i.e., "skipped": that is, blocks start to be sent from $P_0$ to $P_1$ without waiting for data-integrity validation. By adopting the approach of FIG. 5, the peer $P_0$ may share data to $P_1$ as soon as a block is received.

In various embodiments, a check may be maintained in order to avoid error propagation towards the whole P2P swarm: in such a case, an error may not be detected during the sharing process and, therefore, may be recognized only by the end user, so to say "manually", that is when the content is opened and played, after full-content download.

A data-integrity check may represent a basic verification test in those P2P environments where single users may have malicious intentions, that is, where data can be manipulated. This simply represents a matter of network trust: the more one node may trust its neighbors (and, also, the network conditions), the more it can relax security measures, with network trust going with the need of security in P2P scenarios. In an environment of Set Top Boxes sharing content in a network made of gateways, routers, and peers distributed over the whole world, security may require, at the application layer, specific checks, tests, and verifications that are written into the P2P protocol, a data-integrity check possibly being just one of these checks, tests, and verifications.

This means that protocol arrangements may be somehow "tuned" to speed up the overall download time, by observing that, while one may not trust 100% a P2P network, a judicious compromise may be arrived at between speed and security. In the past, security has been a basic point in P2P networks because software could be downloaded for free and any participant in the system could pollute the P2P network by resorting to very simple "tricks". Requirements in terms of security may, however, be relaxed by noting, e.g., that a STB can host a private encrypted network that is close to end users.

Redundancy may be generated by the immediate sharing of identical blocks among peers that are somehow close to the same supplier. Especially at the beginning of the download session, if only one seed is available, each peer can forward what it has just received. Identical blocks may thus diffuse over the network and be shared among the peers. Especially in large P2P networks, a peer which is far from the root may ask for new pieces from two suppliers and receive exactly the same blocks from both of them: bandwidth may be saturated and the global-network efficiency consequently reduced.

Figure 6:
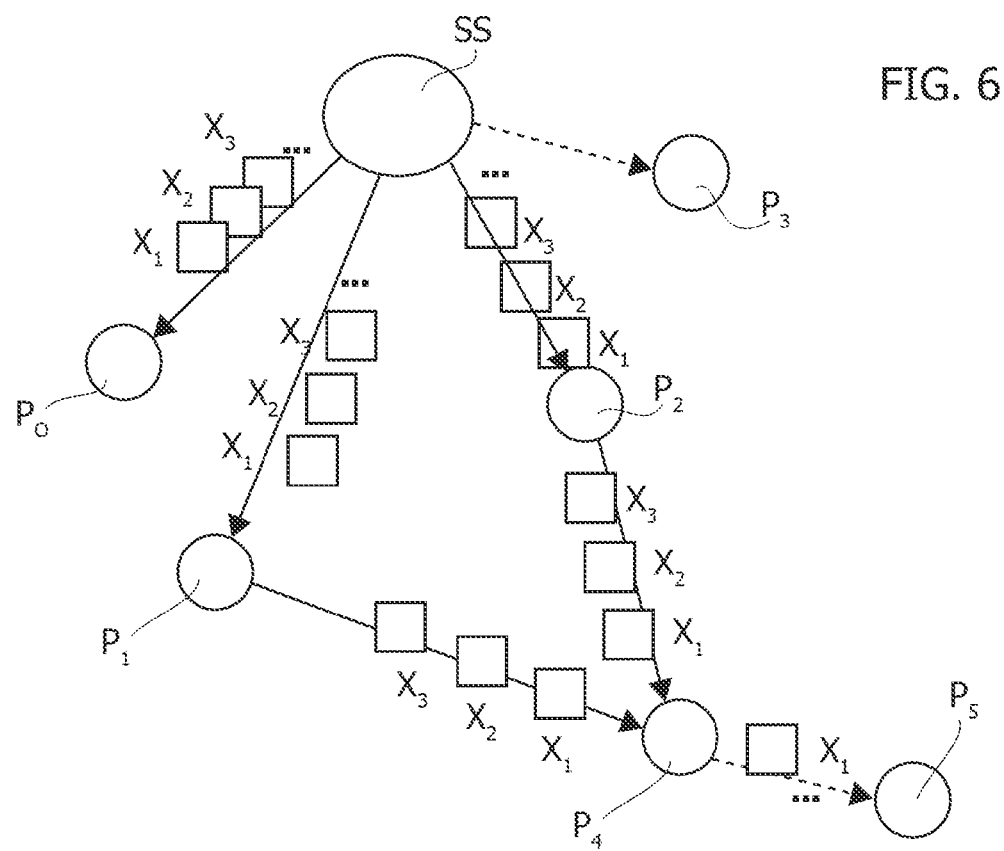
FIGS. 6 and 7 represent block-distribution schemes in cooperative networks.

FIG. 6 is exemplary of a situation that may arise if the issue of information redundancy during the file-sharing process is not addressed: the two nodes $P_1$ and $P_2$ share the same information received from a seed supplier SS, and the node $P_4$ may receive from both $P_1$ and $P_2$ the same information, with undue redundancy.

Figure 7:
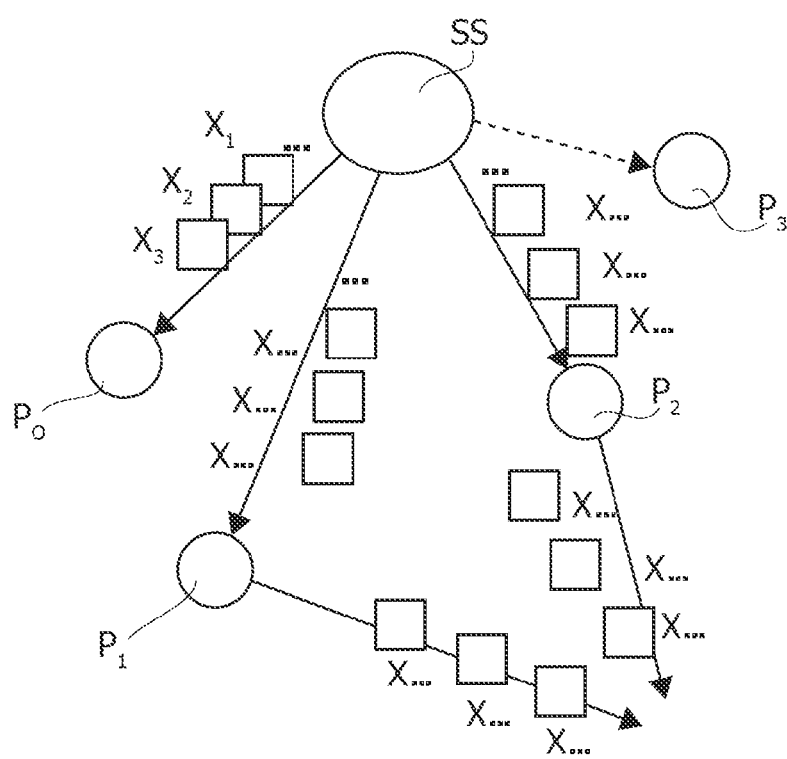

FIG. 7 is exemplary of a mechanism which, in various embodiments, may enhance the diversity of information that flows into the network: thanks to differentiation in the content delivery (greater information diversity), redundancy among blocks that flow in the network is reduced.

In various exemplary embodiments of the Bit Fountain Delivery Remap (BFDR) arrangement considered herein, the P2P network may rely on peers that share blocks as soon as they are received: in various embodiments, in order to deal with the redundancy issues discussed previously, the possibility is considered for the protocol to link digital-fountain or DF block delivery and digital-fountain block generation with the target of promoting diversity of the information distributed into the network.

In various embodiments, a goal pursued may be sharing, as much as possible, new information to generate models to coordinate and diversify distribution, by, e.g., having DF blocks that are (first) all different and thereby creating a model to generate different DF blocks, i.e., a model adapted to diversify as much as possible the information shared in the network.

Various embodiments may thus provide a file-sharing scenario, e.g., for video-streaming distribution in a P2P network, wherein the virtues of the DF mechanism are exploited to diversify as much as possible the DF generation.

In various embodiments, this may involve a development of the Bit Fountain (BF) protocol disclosed in US 2011/0161457, which is incorporated by reference. Various embodiments may follow the main rules of the sharing mechanism just as is the case in Bit Torrent, while making download faster by delaying the validity (integrity) check of the information for the pieces.

In various embodiments, the risk that data integrity might be put at stake by malicious peers may be taken into account by noting, e.g., that:
a network made up of Set Top Boxes (STBs) may by itself be closed and secure: the peers, in fact, require an authentication;
other techniques, such as those known as "byzantine generals", where the peer asks for good references from neighbors, raise the level of security and prevent content sharing with bad peers.

Various embodiments may also address the issue of redundancy through a sharing mechanism which aims at maximizing the diversity of information shared in the network through different DF blocks.

Various embodiments may involve one or more of the following features:
validation, e.g., hash validation, may be delayed since (from the protocol's point of view) blocks are shared before piece validation. In real terms, the hash may not be necessarily "displaced", while blocks being shared before piece validation causes the protocol to behave differently: the peer shares blocks while not yet having reconstructed the piece and computed the hash, that is, with validation "delayed";
DF block generation may be based on the recognition that it is possible to build different DF blocks from the same blocks, and that such diversity may be exploited to avoid redundancy;
delivery of DF blocks may be "remapped" according to the peers in the network;
possible redundancy delivery loops may be dealt with according to various options.

Figure 8:
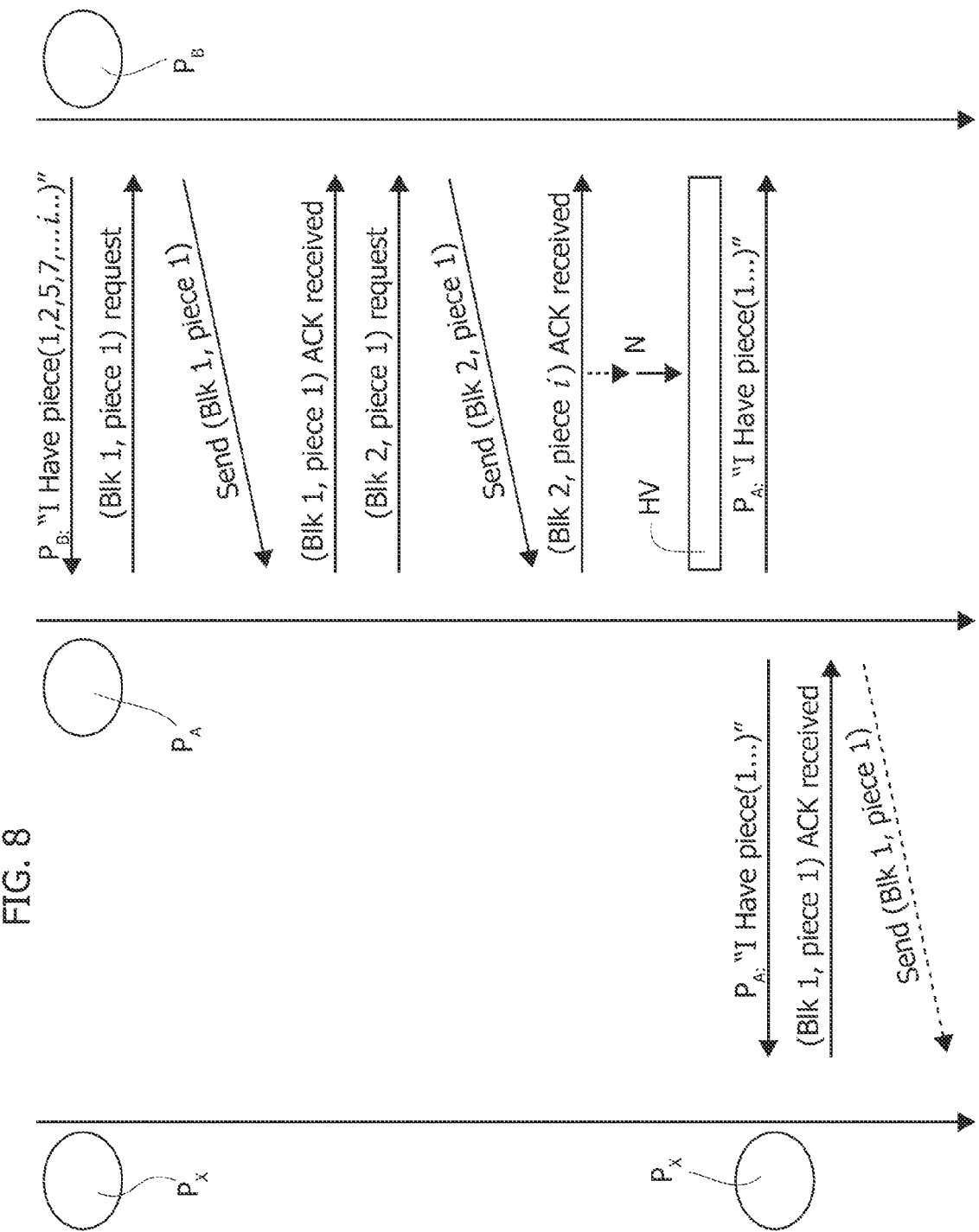
FIGS. 8, 9, and 10 are exemplary of block-delivery in cooperative networks.
Figure 9:
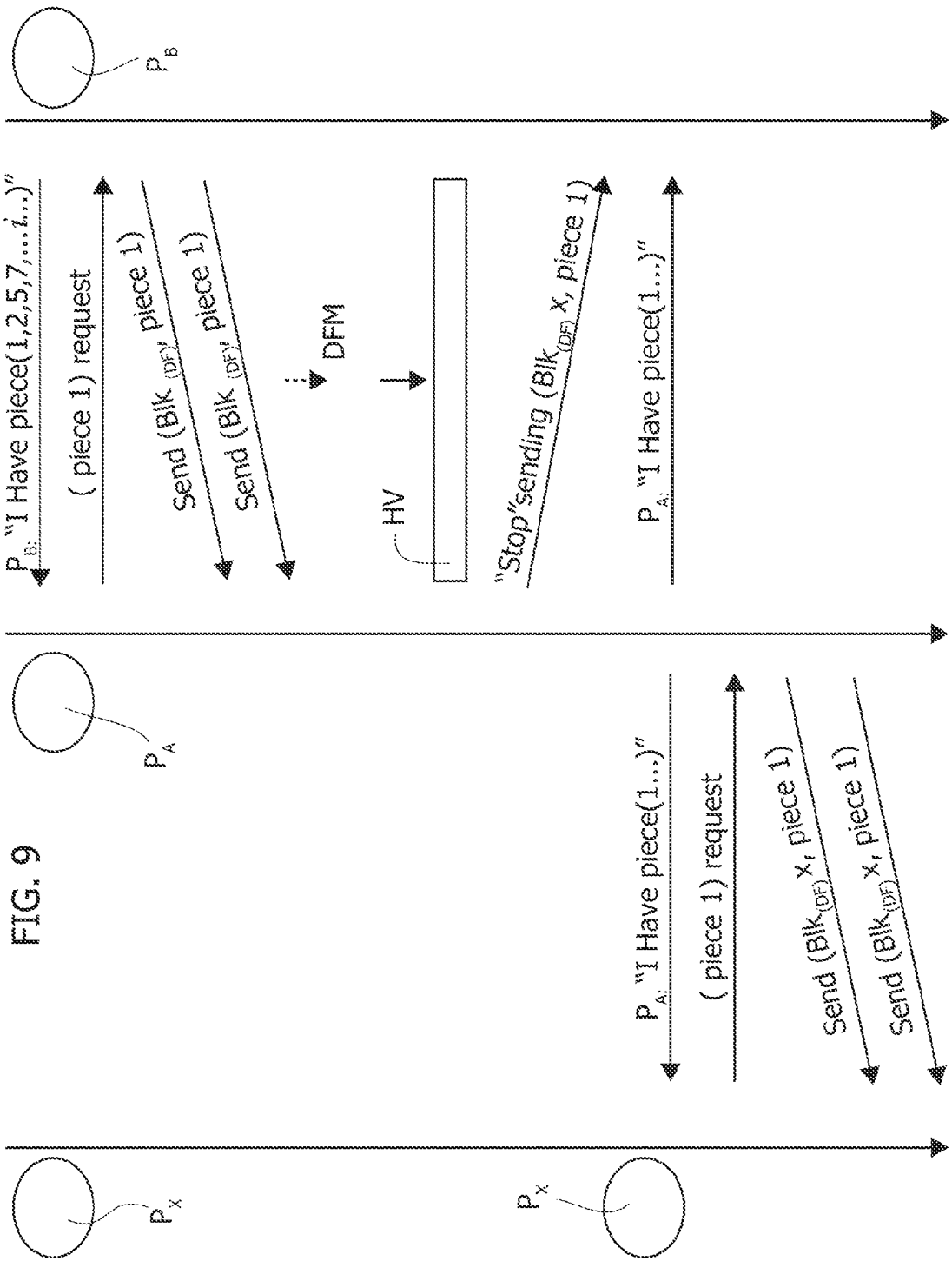
Figure 10:
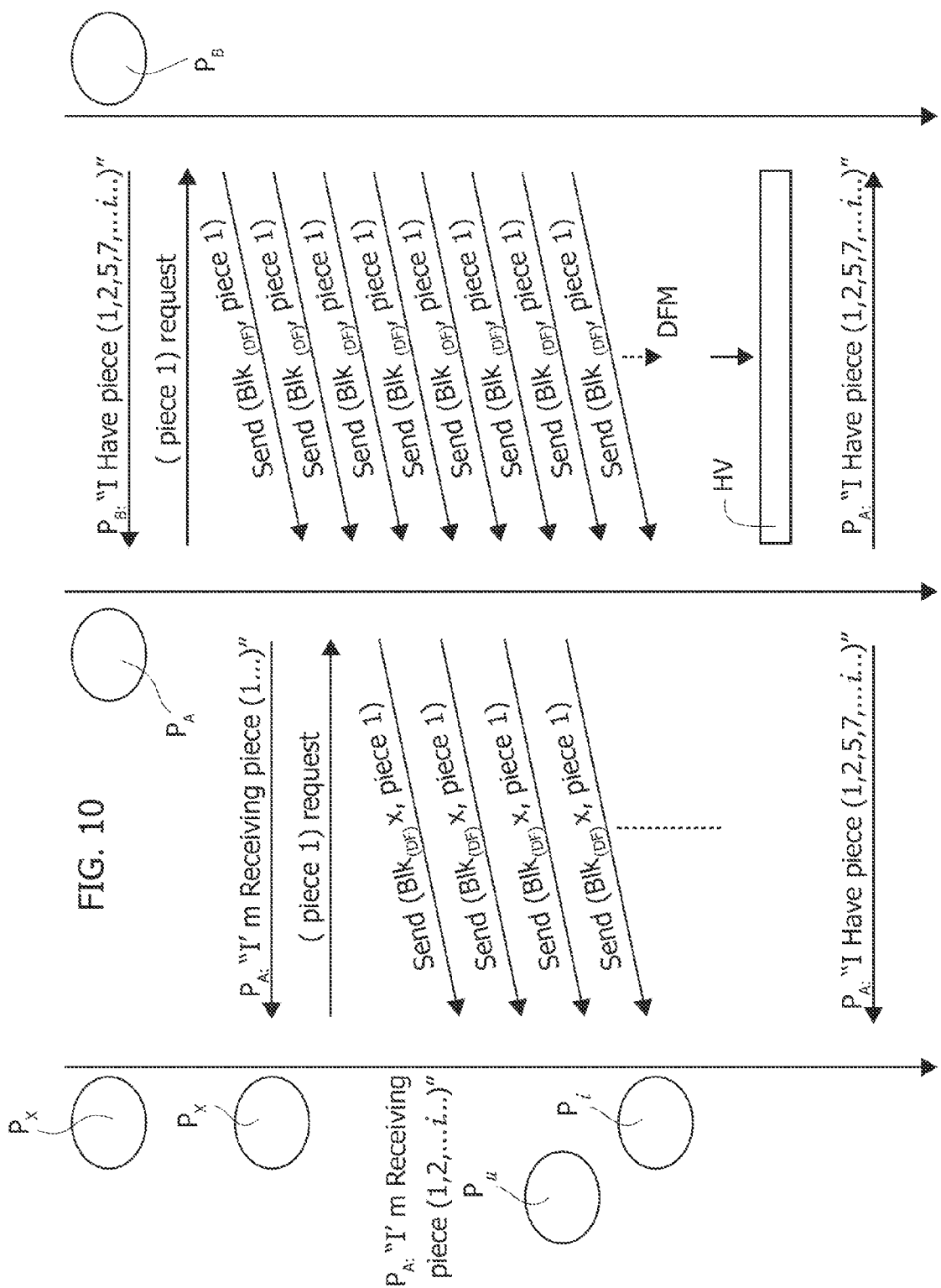

FIGS. 8, 9, and 10 are illustrative of various block-delivery strategies in file-sharing systems, as adapted to be implemented in cooperative networks (e.g., P2P):
conventional BT protocol,
BF protocol (i.e., US2011/0161457, which is incorporated by reference),
various embodiments herein.

The sequence diagrams of FIGS. 8, 9, and 10 thus refer to arrangements where information content arranged in pieces including blocks of bits is sent over a network including a first peer terminal (i.e., $P_A$) and at least one second peer terminal (i.e., $P_X$). In such arrangements, a set of blocks B of a corresponding piece of information PE are received at the first peer terminal $P_A$ (e.g., from a "seed" $P_B$, which may be another peer terminal). The corresponding piece is reconstructed from the set of blocks B received at the first peer terminal $P_A$.

The sequence diagrams of FIGS. 8, 9, and 10 refer to a situation where a new piece i has been downloaded by a generic peer; a protocol is set up to advise all the adjacent peers through a so-called "Have" message saying e.g.,: "I Have Piece 1, 2, . . . i . . . ".

Such a message lets the neighbors know "who has what", thus enabling them to forward to a peer who has a certain piece requests for such a piece they "want" to download.

In the arrangement exemplified in FIG. 8, blocks are shared among peers only after a piece has been validated. For instance, the peer $P_A$ may receive from $P_B$ the message that some piece is available for download. $P_A$ then may ask $P_B$ for Piece 1. $P_B$ answers by sending the corresponding blocks.

The logic model as portrayed in FIG. 8 is otherwise conventional, thus making it unnecessary to provide a more detailed description. When $P_A$ has received from $P_B$ all the blocks that make it possible to reconstruct Piece 1, then $P_A$ executes piece validation through, e.g., a hash-integrity check HV of the reconstructed piece. The peer $P_A$ will send a Have message to update its neighbors. $P_X$ will receive the message and forward to $P_A$ a request for Piece 1. $P_A$ will be able to share the new content of Piece 1 with another peer $P_X$ only after piece validation.

In the arrangement exemplified in FIG. 9, i.e., Bit Fountain or BF (see, e.g., US2011/0161457, which is incorporated by reference), the pieces of information PE distributed over the network are fountain encoded by XOR-ing the blocks in a piece so that a received piece may be reconstructed (i.e., is "reconstructable," e.g., via the matrix DFM) from a combination of a corresponding set of linearly independent XOR-ed blocks (such as $X_1, X_2, X_3, \ldots$ in FIG. 2).

In that case, information delivery is not constrained by any specific block request, in that no request for a specific block is made. Information is "spread" or (intuitively) "interleaved" over many blocks ($X_i$) via the digital-fountain mechanism. Thanks to the digital-fountain encoding mechanism, when $P_A$ receives a sufficient number of blocks, $P_A$ will be able to invert the DF matrix (as indicated at DFM in FIG. 9) and reconstruct Piece 1, which becomes reconstructable when the DF matrix (see, e.g., FIG. 3) becomes invertible. Then $P_A$ will execute piece validation (e.g., a hash integrity check) HV just as shown for BT in FIG. 8.

Again, only after piece validation, $P_A$ will be allowed to share the new content of Piece 1 with another peer $P_X$. In the arrangement of FIG. 9, delivery is no longer linked to a specific block request. The peer $P_X$ sends all at the same time a group of requests for blocks related to piece 1. Any DF block is valuable in order to collect information so that, rather than collecting the "right" blocks related to the piece, the steps of inverting the DF matrix—in other words having enough (linearly independent) blocks to invert the matrix in order to reconstruct the piece—and validating the piece are at the basis of piece transfer. Once validation succeeds a "stop" message may be sent from $P_X$ to $P_A$ to cancel all pending requests related to the same Piece 1. Also, no acknowledgements are needed to notify that the block has been properly received: $P_X$ sends a group of block requests to $P_A$ all at the same time, and when the DF matrix can be inverted, $P_X$ sends only one message to $P_A$ to delete all remaining pending requests.

Through the integration of the digital fountain (DF) mechanism of, e.g., US2011/0161457, which is incorporated by reference, various embodiments may be somewhat moving from a "pull" model, where $P_B$ answers to the needs of $P_A$, to a "push" model, where $P_B$ sends blocks without signaling overhead. In order to fully exploit such a digital-fountain mechanism, various embodiments may "break" the validation constraint inherent to the fact that the piece validation step may prevent $P_A$ from sharing the partial download of Piece 1 to other $P_X$'s.

In various embodiments as schematically illustrated in FIG. 10, the delivery of the partial download of the Piece 1 may be authorized as soon as $P_X$ has notified its neighbors that it has no block data relating to Piece 1 and that $P_A$, which is a neighbor to $P_X$, has notified neighbors that it "is receiving" (e.g., from $P_B$) blocks relating to piece 1.

Stated otherwise, as soon as $P_A$ has downloaded a block from $P_B$, it can forward that block to another peer, e.g., $P_X$, which means that the first peer terminal ($P_A$) starts sending to the (at least one) second peer terminal $P_X$ blocks from the set of blocks being received (from $P_B$) before the corresponding piece of information becomes reconstructable from the set of blocks received.

To that effect, the relative protocol may be supplemented to include a new message for sending by, e.g., $P_A$, namely "I am Receiving piece (1, 2, . . . i . . . )".

In case of a long-distance connection, the presence of a small-signaling control message may cause appreciable differences not only as regards the time of download of the whole swarm of peers, but also in the management of the messages (and in complexity for developers).

Various embodiments may thus take advantage of the possibility of making assumptions, e.g., in terms of security in a (semi) controlled network such as a STB network.

Various exemplary embodiments may take advantage of the fact that the number of possible DF blocks associated with a same source piece may be very high and may be exploited to deal with the issue of redundancy.

FIGS. 11 and 12, each including two portions designated a) and b), are representative of how DF blocks may be generated with respect to pieces in a conventional BT protocol, in BF (i.e., US2011/0161457, which is incorporated by reference), and in various embodiments herein.

For instance, a conventional BF approach—FIG. 11 a)—provides for each original source piece SRC, including N blocks, being converted via a DF procedure 100 into a single "DF piece" including a number $N_{DF}$ of DF blocks.

In fact the same original piece SRC may be represented by many different DF pieces, generated by different XOR combinations among the N blocks of the original piece SRC. FIG. 11 b) schematically shows how the DF procedure 100 may generate a plurality of up to $2^N$ different DF blocks $DF_i$ with $i=1, \ldots, 2^N$, which is the maximum number of possible combinations of N initial blocks in the piece SRC.

As schematically represented in FIG. 12 a), such a plurality of up to $2^N$ different DF blocks may be seen as a DF sequence DFS which, as schematically represented in FIG. 12 b), may be split at 102 into DF sections DF1, DF2, . . . where each such DF section contains the whole information of one original piece SRC.

The correspondence between the original source space and the DF piece/section space may be represented as shown in FIG. 13, that is as a correspondence between a source-piece-space domain SRC S and a DF piece/section space DFP S. Each piece in the domain of the source space SRC S corresponds in the DF piece/section space co-domain DFP S to a DF sequence DFS which is a set of DF pieces/sections, where each piece/section is made of $N_{DF}$ DF blocks.

Although "DF piece" and "DF section" are conceptually equivalent and represent the same type and amount of information in the DF piece/section space, the rest of this description will refer to the "DF sections" in order to highlight the possibility of identifying a DF piece through an index in the DF sequence DFS DF1, DF2, DFi, . . . ).

In brief:
a source piece SRC is just a piece of the original file F, which may be split into pieces or portion of files: the information therein has not been mixed, interleaved, manipulated; it is in the "pure" form it had in the original file;
a source piece block is a block of the original file: a piece is in fact comprised of blocks. A source piece SRC is made up of its related source blocks 0 to N. Again, the information has not been mixed, interleaved, manipulated; it is in the "pure" form it had in the original file;
N denotes the number of blocks in one piece SRC from the original file;
each DF block is generated by XORing a set of source blocks;
for each source piece SRC it is possible to build $2^N$ DF blocks. The sequence of DF blocks generated by the DF procedure 100 until the whole possible set of XOR combinations has been covered, is referred to as a DF sequence DFS. The sequence DFS is associated with only one original piece SRC;
a DF section (DFi) is a portion from the file after DF processing 100; each DF section is comprised of $N_{DF}$ blocks, i.e., $N_{DF}$ is the number of DF blocks in one section; the whole DF sequence DFS may be split into DF sections DF1, DF2, . . . ; each DF section contains all the information of the original piece SRC insofar as each DF section represents a different XOR combination of blocks of the original piece.

For instance, an (original, i.e., source) piece SRC made of 100 blocks may be considered (of course as a merely exemplary case, not binding for the embodiments). If N=100 and $N_{DF}$=1024 (i.e. a highly redundant DF block) there are (still) $2^{100}/2^{10}=2^{90}$ possible DF sections related to the same original piece SRC.

In fact $2^{90}$ DF sections being possible for the same initial piece SRC is a very high number.

Consequently, in various embodiments, each piece request can be associated with a different DF section, and still share information of the same piece SRC.

Figure 14:
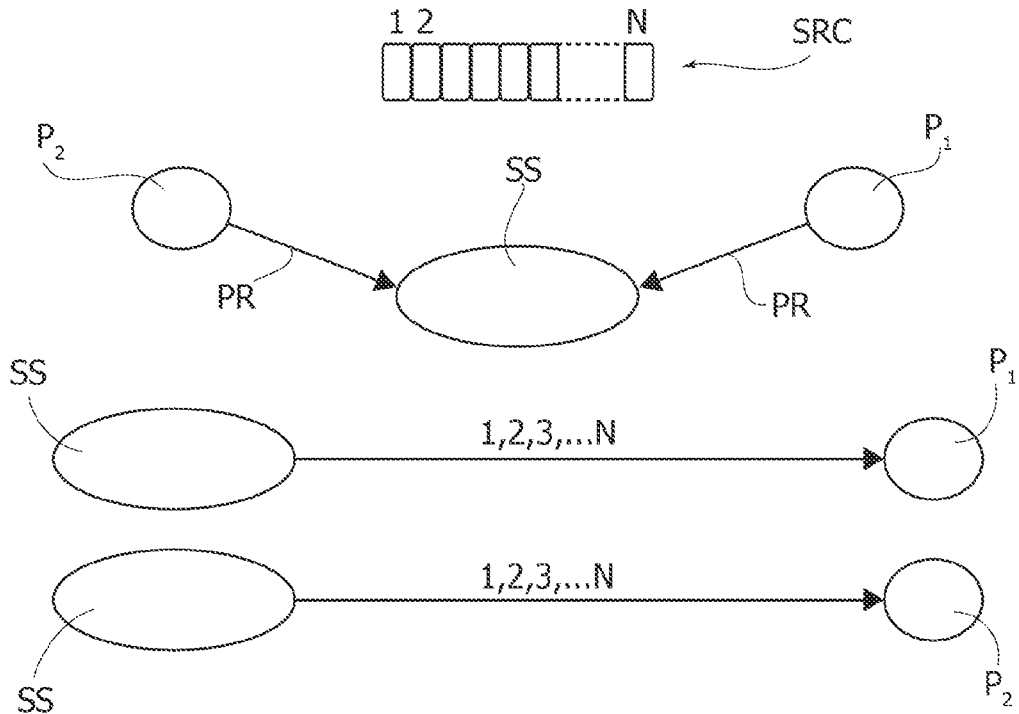
FIGS. 14, 15, and 16 exemplify various types of information diversity.

A FIG. 14 is exemplary of a conventional BT arrangement where a peer $P_1$ asks (i.e., places a piece request PR) for a piece to a node acting as the "supplier" SS. Then $P_2$ peer asks the supplier SS for the same piece (i.e., same piece request PR) and the supplier SS, again, sends exactly the same blocks to both $P_1$ and $P_2$. As the blocks 1, 2, 3, . . . , N (see bottom part of FIG. 14) are just "replicated" in the network for both $P_1$ and $P_2$, no information diversity is present.

Figure 15:
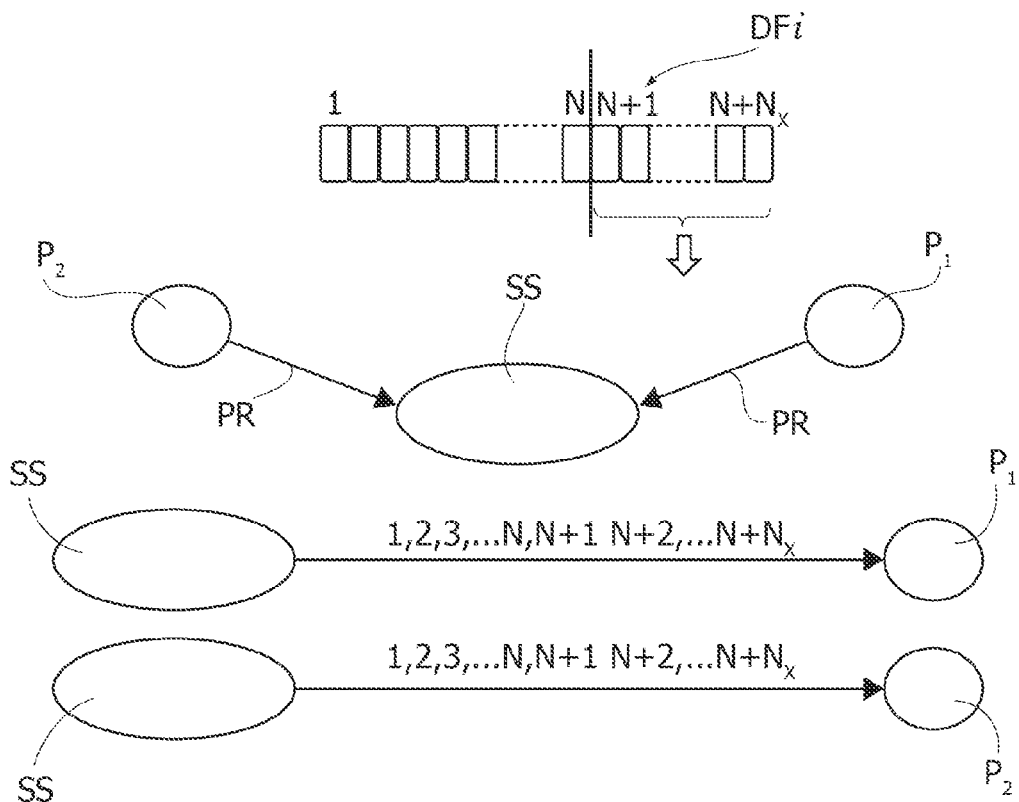

In a Bit Fountain (BF) arrangement as exemplified in FIG. 15, the pieces shared in the network are all made of DF blocks. Each DF piece/section may have, e.g., N=100 DF blocks: those blocks represent the whole information needed to recover the original information for reconstructing the source piece SRC. Since sudden network congestions or bandwidth oscillations may disrupt the flow of blocks over the network, the peers may miss some blocks among the N blocks sent by the supplier to the peer. As each DF block can be useful to invert the DF matrix and reconstruct the original piece, the supplier SS just keeps generating and sending more DF blocks: for example $N_x$ as indicated in FIG. 15, which may be equal to, e.g., 50. So, whenever $P_1$ asks for a piece (piece request PR), the supplier keeps sending blocks to $P_1$ until a number of $N+N_x$ (150, in the non-binding example made here) blocks is reached. If another peer $P_2$ asks for the same piece (same piece request PR) the supplier SS sends the same $N+N_x$ (e.g., 150) DF blocks. As schematically shown in FIG. 15, in terms of information diversity, the network is hosting 50 new DF blocks per piece.

Figure 16:
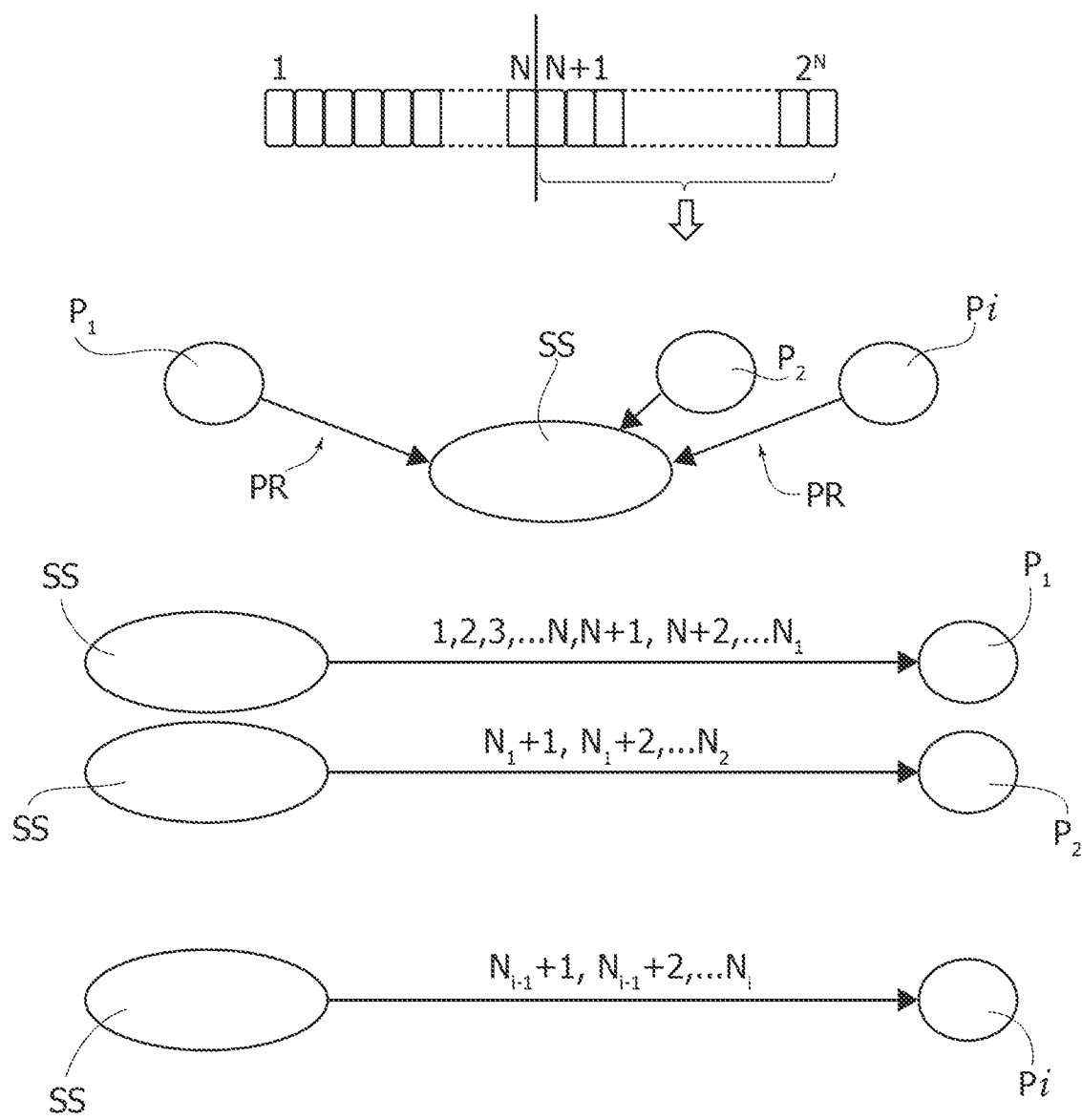

In various embodiments as schematically represented in FIG. 16, further information diversity may be pursued by further exploiting the DF mechanism. By referring again, by way of non-limiting example, to a piece including N=100 blocks, it is possible to generate a high number of DF blocks ($2^{100}$ possible DF blocks). As discussed in the foregoing, the whole DF sequence DFS can be split into a high number of sections (in the exemplary, non-binding case considered herein, $2^{100}/100 \approx 2^{93}$). Being able to satisfy a same piece request by disseminating, each time, different sets of DF blocks may enhance diversity of the information flowing over the network.

By adopting such an approach, piece requests PR can be met by the supplier SS by means of DF blocks flowing over the network that are all different and still represent the same piece.

Various embodiments may address the issue of how to "remap" the delivery of the DF blocks relating to a piece, that is, what parts of a whole DF sequence DFS may be used to satisfy two identical piece requests from one peer in the network.

Exemplary approaches adapted to be used in various embodiments may include:
a link to the network topology;
a pseudo-random choice.

A basic concept underlying the former approach (i.e., link to the network topology) is linking each DF section (i.e., a section of the DF sequence DFS) to a position of the node in the P2P network tree.

A relationship between DF block generation and network mapping may be the following: the number of hops H from the root of the tree structure (e.g., the initial seed SS, or possibly the tracker T) may represent information associated with the knowledge of the neighbors, e.g., as a result of the search that each peer performs when entering the P2P network. The maximum number R of receiver peers per seed or supplier may also provide related information.

A DF engine provided with these input parameters may thus identify a precise DF block in the DF sequence, i.e., may link the network topology with DF block generation based on certain rules.

Figure 17:
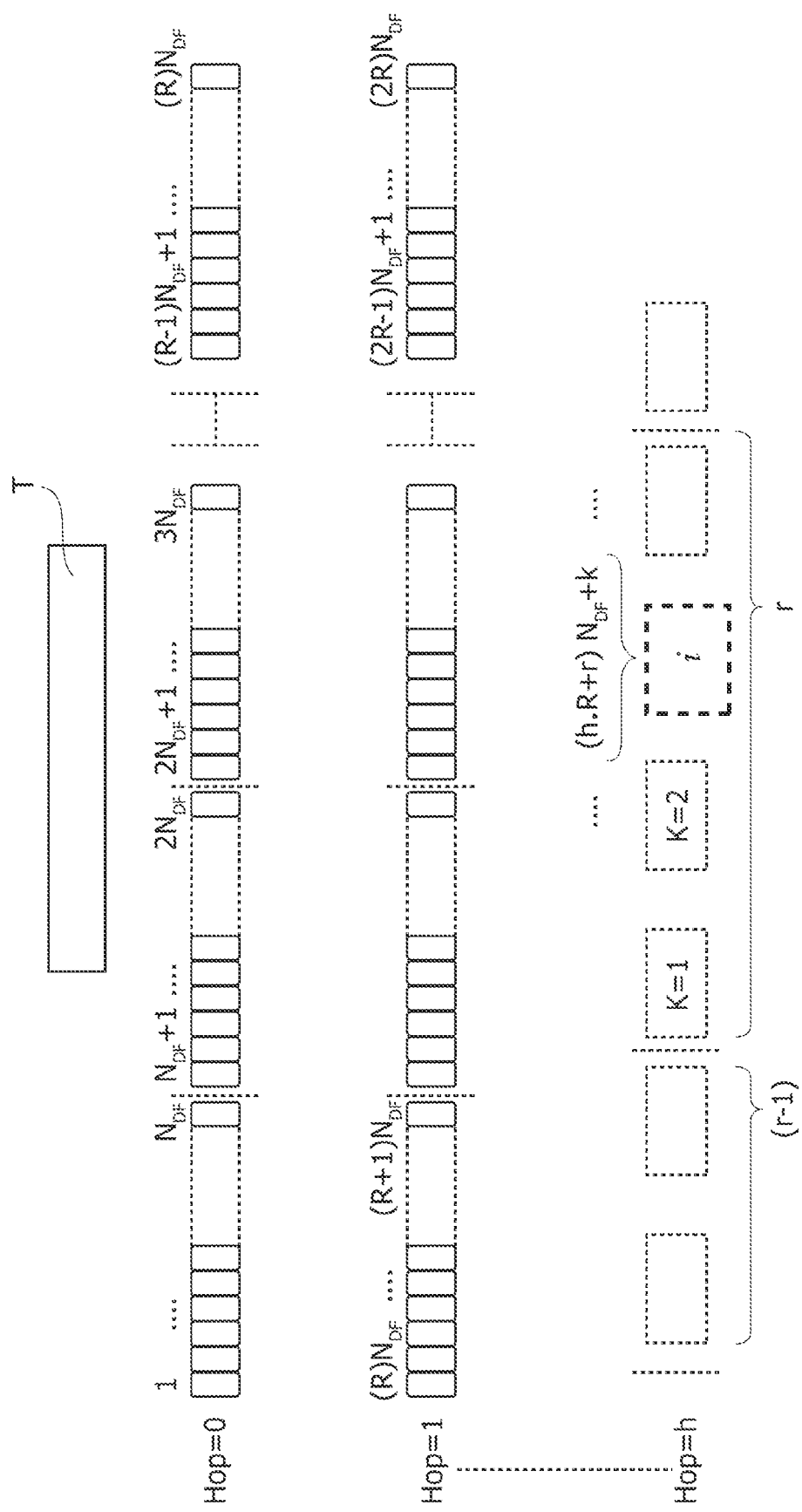
FIG. 17 is representative of an XOR tree for digital-fountain-block generation.

An exemplary rule may involve identifying each DF section by at least one of the hop h from the tracker T and the index r for the receiver peer as schematically represented in FIG. 17.

By way of non-limiting example, starting from a set of input parameters such as:
$N_{DF}$=# DF blocks per piece
R=Max receivers per seed
H=hops from root
r=[0, R−1] index receiver
k=[1, $N_{DF}$] index DF blocks
h=[0, 1, . . . ] hops from tracker
the following return values:
i: index of the DF block in the whole DF sequence
s: index of the DF section
may be computed based on the following formulas $$i = (h \cdot R + r)N_{DF} + k \quad \text{Eq. 1}$$

$$s = (h \cdot R + r) \quad \text{Eq. 2}$$

As schematically represented in FIG. 17, Equation 1 can both shape the P2P tree and indicate to the DF generator of the seed the strategy to collect DF blocks from different DF sections for each receiver peer in order to maximize the diversity of the information in the network.

An elementary tree network may stem from one seed. The BFDR procedure as exemplified herein will distribute the blocks with one root at the top of the network flow that starts from the seed and propagates through the rest of the nodes following Equation 1.

By way of simple explanation, one may refer to an exemplary scenario where R=2 and only one seed (for example the main server of a content broadcaster) is present. The root is at the level/hop '0'. The root has two "children", and each child has in turn two children:
Hop 0: 1 node;
Hop 1: 2 nodes;
Hop 2: 4 nodes . . . and so on . . .
Hop h: $R^h$ nodes;

Equation 2 may identify the section just like Equation 1 may identify the block to be supplied by the peer identified by the couple (r, h) in the network map. In fact, it is sufficient to know the hop (the "distance from the top") and the receiver index (the "distance from the left") to locate the peer in the tree.

In various embodiments, the model and formulas above may permit identifying the relationship between the "parent" and the "children" sections.

For instance, one may assume that the integer index X identifies the DF section in the DF sequence that a generic peer is receiving. In that case, not the position of the peer in the tree but rather the position of the DF section received in the whole DF sequence may be of interest.

One may refer to the sections that, later on, will be supplied and received by the "children" as $X_{chld}$, where $X_{chld}$ represents the integer index pointer in the DF sequence. In other words, while the section supplied may be identified using Equation 2, the section that the (child) peer will supply later on may be identified via the following formula:

$$(r \cdot X) \leq X_{child} \leq (R \cdot X) + R - 1 \quad \text{Eq. 3.}$$

With reference to the scheme just described, in various embodiments the possibility may exist of choosing the parameter R, that is the maximum number of receiver peers per supplier (seed) complying with certain conditions. That means, i.a., that each supplier/seed may have a value for R of its own, that is $R_i$.

Various embodiments may adopt variant solutions:
R may be decided arbitrarily by the developer via a predefined table;
R may be in relation with the number of hops via a generic function;
R may decrease while the tree gets larger in order to allow for the increase in size of the whole swarm;
R may increase with the number of hops, if bandwidth is available, to collect the contributions of the upload resources of each peer in the swarm and decrease the duration of the startup phase;
R may be a function of the upload bandwidth available at the supplier;
R may be a function of the download bandwidth available at the receiver peer; for instance, the receiver peer may have a download connection which is excessively limited because other services are running: so instead of 10 downloading sessions from suppliers at the same time, only 2-3 sessions may be accepted;
R may be dependent on event congestions revealed by external (i.e., "third") algorithms/engines;
R may be dependent on the type of service/feature desired by the receiver peer (i.e., end user); for instance in some embodiments, preference may be given to downloading in an ordered (chronological) fashion. If the bitstream downloaded represents video content, the end user may be interested in previewing the contents of the program just downloaded. Therefore, out of a DF piece related to the end of a movie and a DF piece at the beginning, the protocol may choose the latter in order to get a flowing video consumption without undesirable "freeze";
R may be dependent on the behavior of the peer; a table, ranking good and bad peers, may inhibit a supplier from initiating upload sessions to bad peers, thus giving an (at least first) preference to good peers;
a combination of the options above.

A mapping scheme generated by these exemplary rules may shape (or map) a P2P network as a logical tree, which is the dual-family scheme opposed to a mesh where contributions from the various peers follow a best-effort rule. While a mesh may be more robust than a tree in case of node failure or user disconnection, a tree may be more efficient, especially in the BFDR procedure exemplified herein, where information packets tend to be "pushed" rather than "pulled" i.e., requested.

The exemplary scheme considered as represented by Eqs. 1 and 2 may reveal that, as schematically portrayed in FIG. 17, information may generated following Eq. 1 in a deterministic fashion at Hop H=1. In fact, the peer that has received the whole piece can create a "right" DF block from the proper DF section identified by the mapping scheme. If a peer had just received some block but not the whole piece, it is possible for it only to forward some blocks. At the beginning, the root (or seed) node has the whole piece, while the nodes at the $1^{st}$ hop can only retransmit, the nodes at the $2^{nd}$ hop benefit from the diversification that took place at the root.

Thus, in various embodiments, all the other nodes may receive the same information until the nodes of the $1^{st}$ hop have received the whole piece and become in turn seeds/suppliers. The scenario gradually improves once the nodes of the $2^{nd}$ hop have received the whole piece—and become seeds/suppliers—and so on for each hop of the P2P tree.

Stated otherwise, in various embodiments, Eq. 1 may be "respected" at the beginning only by the root node; as time elapses and pieces are fully downloaded, Eq. 1 will be increasingly "respected" also by more distant nodes from the root as these become in turn seeds/suppliers. This is a sort of radial or "spherical" propagation within an ever-improving scenario as nodes enter at different times in correspondence with different logical locations of the tree, so that after some time seeds are distributed over the network and not just concentrated at the root of the network. In various embodiments, this mechanism may benefit from diversification of information delivery realized at the DF generation module as well as from the different distribution of seeds and resources in the network, this being likely to be a real scenario for a network.

An exemplary mapping scheme as described previously may be suited to a broadcaster's needs, since a broadcaster may usually have an interest in being the actor who delivers the contents into the network, while the overlay may be defined by one initial seed and a "forest" of e.g., Set Top Boxes that operate just as repeaters of the content streamed by the broadcaster server.

Especially when the content is not "live", certain Video On Demand scenarios for large CDN's may provide for the presence of more than one seed in the network: for instance, a user can connect after half an hour, or can be just interested in one part of a full content, for example in a sports section at the end of a news section; also, more than one seed server may be an option for large regions served by a same content provider. In general, an interest may exist in that plural seeds are involved in content distribution.

Figure 18:
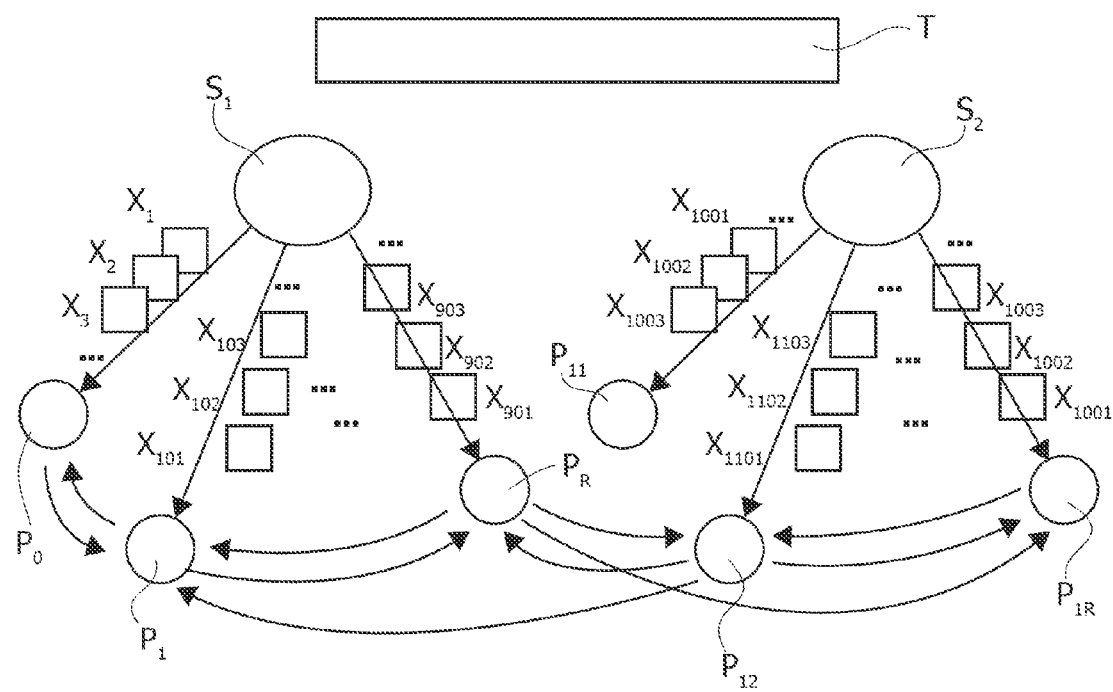
FIG. 18 is exemplary of use of seeds in embodiments.

FIG. 18 provides a differentiated exemplary graphical representation of flows belonging to different sections of a whole DF sequence DFS, by highlighting the possibility for each peer to receive a same piece with different DF blocks.

For instance, in the non-binding exemplary delivery distribution scheme of FIG. 18:
the number of blocks per DF section (or piece) is $N_{DF}$=100;
the maximum number of receivers R per seed is R=10. The delivery index i is indicated for each block sent to each peer.

Block $X_i$ denotes the (only) block of the whole DF sequence and $P_R$ represents the peer corresponding to:
a receiver of seed 1 that belongs to the $1^{st}$ seed group (sub-tree under seed 1);
a peer at Hop h=0 from a seed of the network; since R=10, then (if one assumes that indexes start from 0) $P_R$ is $P_9$.

In various embodiments, the tracker T may trace (in a known manner) the number of seeds that share the content in P2P network, which makes it possible to manage the content distribution by forcing all blocks to be different to the receivers at one hop from each seed.

FIG. 18 also evidences that, through the supervision of the tracker T and Equation 1, all peers may share different information. Specifically, FIG. 18 exemplifies the behavior of embodiments in the case of two seeds and peers that share blocks at Hop=1 from the root of the tree.

This scenario may be extended to hops >1 from the root of the tree.

Figure 19:
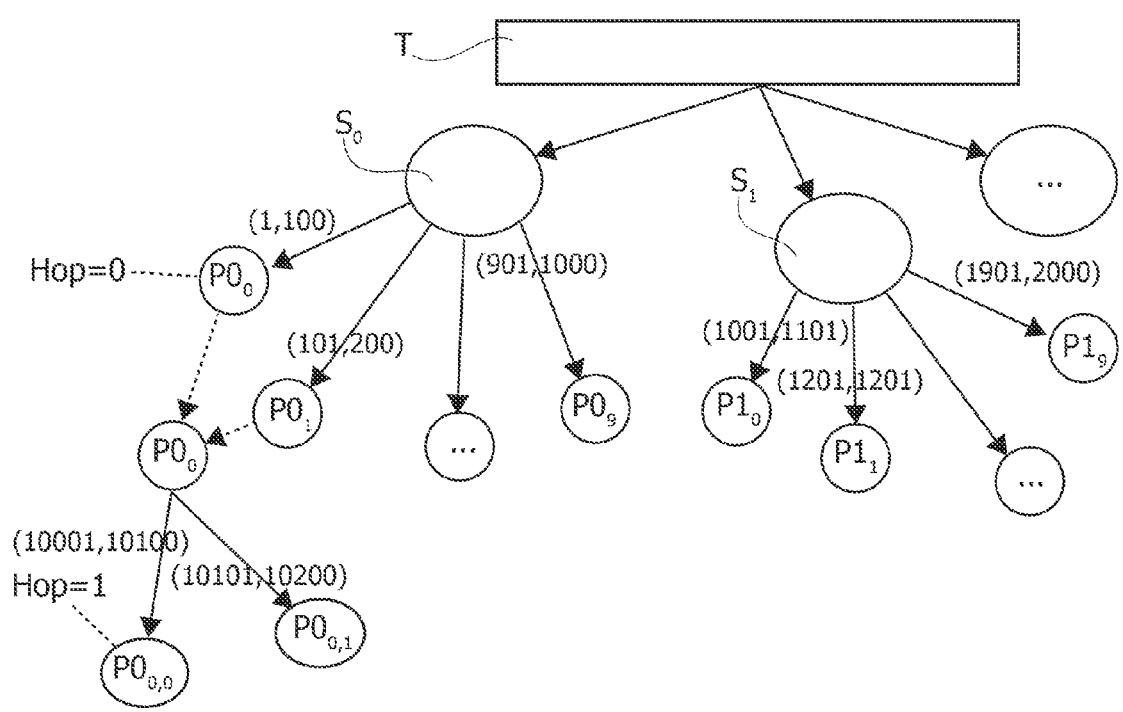
FIG. 19 is exemplary of seeds and peers at multiple hops in embodiments.

FIG. 19 evidences the possible effects of increasing the dimensions of a P2P network in an exemplary delivery distribution scheme where:

the number of blocks per DF section (or piece) is $N_{DF}=100$;

the maximum number of receivers R per seed is R=10.

By referring to Eqs. 1, 2, and 3, the peer $P0_0$ at hop h=0 from the seed of the network will receive the $1^{st}$ DF section that corresponds to the blocks in the range [1, 100], $P0_1$ will receive the $2^{nd}$ DF section that corresponds to the blocks in the range [101, 200], . . . $P0_9$ will receive the blocks in the range [901, 1000] and so on. When $P0_0$ becomes a seed, it dialogues with the tracker T and the XOR tree model is applied to the below sub-tree as indicated in Eq. 1. $P0_0$ at hop h=1 from the seed of the network, receives the $(R \cdot r)^{th}$ section that corresponds to the blocks in the range [1, 100].

In various embodiments, a P2P swarm may host not more than 100 nodes. If the corresponding tree is particularly complex (many hops) peers at the edge at the overlay may still receive the same information.

While the description of exemplary embodiments provided in the foregoing refers to a model that is ideally applicable to a tree scheme (wherein each node has multiple receivers but only one supplier per DF section), various embodiments may apply to situations where peers may have multiple suppliers that are forwarding the same DF section. In certain situations, e.g., in the case of medium-large networks, far peers may not yet have different blocks, especially at start-up of a large P2P sharing session.

Figure 20:
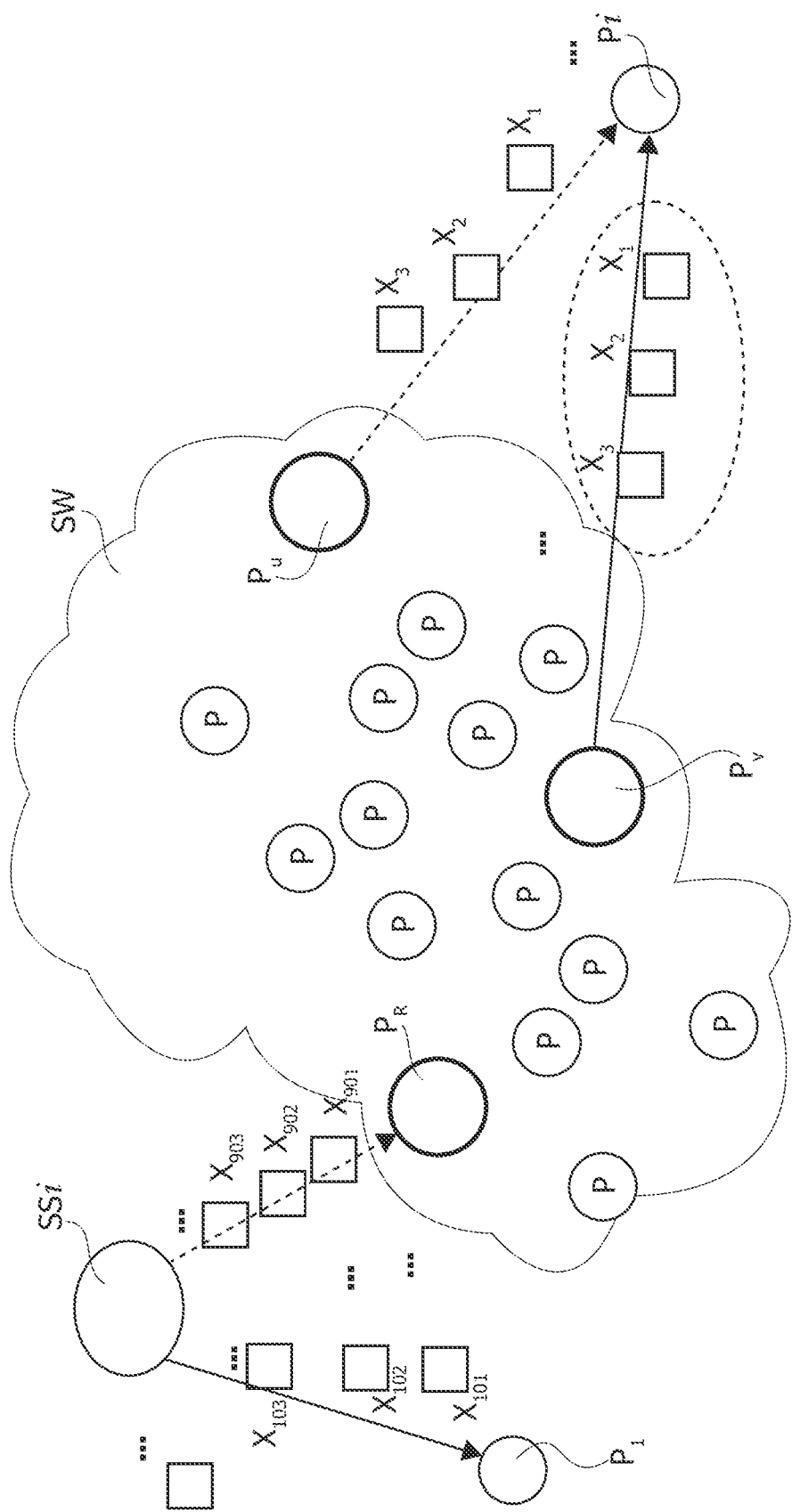
FIG. 20 is exemplary of dealing with far peers in embodiments.

FIG. 20 exemplifies a situation where, with the DF block index "i" identifying in a univocal manner a DF section, the peer $P_i$ receives the same DF section from both $P_u$ and $P_v$.

Sharing the blocks as soon as possible better exploits the available upload bandwidth; however, the fact that an external far peer (as schematically represented in FIG. 20) may receive identical DF blocks related to the same DF section will limit the benefits deriving from a Digital Fountain (DF) arrangement, which aims at ensuring that—within the information spread or diffused in a large P2P sharing session—each block can actually contribute new information.

In various embodiments, this issue may be addressed by providing, in addition to "Have" messages (as discussed in connections with FIGS. 8 to 10), "Receiving" messages which may be used to coordinate reception of, and requests for, identical DF sections.

Figure 21:
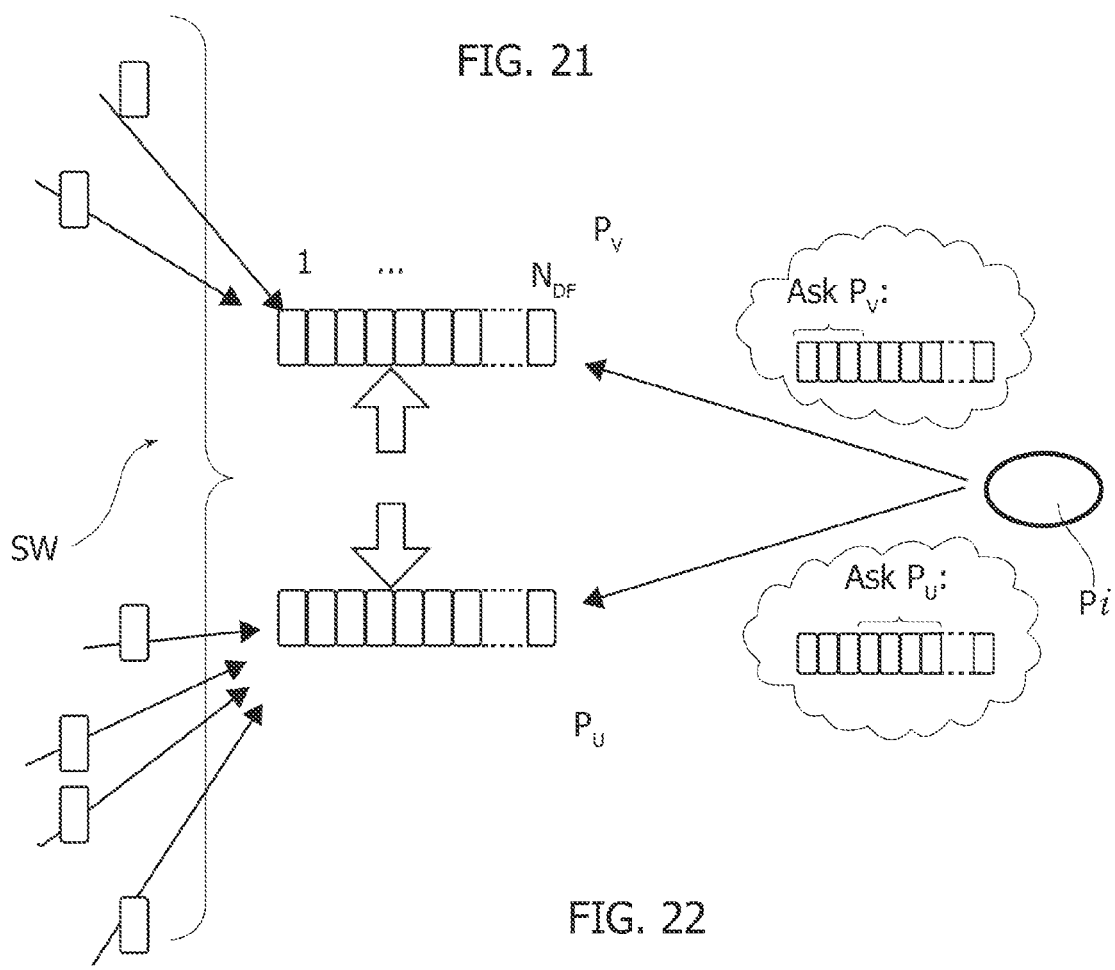
FIG. 21 schematically represents possible coordination of requests for blocks in embodiments.

A simple, real-life scenario is exemplified in FIG. 21, where far nodes, e.g., $P_i$, might end up by collecting identical DF section blocks from a swarm SW at different download speeds. In the exemplary case of FIG. 21, both $P_v$ and $P_u$ are connected to $P_i$, which may coordinate the request of blocks from different parts of the buffer (e.g., the swarm SW). Such an option may be somewhat paralleled to buffer-mapping exchange as provided for in certain P2P protocol clients for streaming or file-sharing applications. There, each node knows pieces or blocks that are available among his neighbors.

Various embodiments herein may not involve asking for a precise block index—as it happens in Bit Torrent (BT)—or sending blocks in a push fashion without any previous check: various embodiments make take advantage of the fact that it is still possible to parallelize requests to the peers $P_v$ and $P_u$ in order to improve download speed by resorting to a general rule of block request.

For instance, in an exemplary, non-binding scenario where the peer $P_i$ asks $P_v$ and $P_u$ for different DF blocks belonging to the same DF section, such a rule may involve e.g., $P_i$ asking:

from $P_u$—the DF blocks in the index group U, where U includes the set of integers $[u_1, u_2 \ldots u_i \ldots u_M]$, and from $P_v$—the DF blocks in the index group V, where V includes the set of integers $[v_1, v_2 \ldots v_i \ldots v_M]$.

Various embodiments may involve any of the following:

i) U and V are sets of consecutive integers, i.e., $u_1=1$, $u_2=2, \ldots, u_i=i$ and $v_1=M+1$, $v_2=M+2, \ldots, v_i=M+i$; in that case: $v_M=u_M$ and $v_i=M+u_i$;

This case may be extended to more than two suppliers, where each set of indexes is (subsequent) next to the other. Also:

$u_M$, $v_M$ may be selected arbitrarily by the developer based on heuristics concerning general network infrastructure characteristics: the values selected may be constant or variable based on network communications conditions;

$u_M$, $v_M$ may vary as a function of the number of available suppliers: for example, the more the suppliers, the smaller the average $u_M$, $v_M$;

$u_M$, $v_M$ may vary in relation to the available bandwidth (known) per supplier $P_v$ and $P_u$: for example, the higher the bandwidth $B_M$ the greater $u_M$, $v_M$; also $u_M$, $v_M$ may vary in case of network congestions or peer turn-over;

ii) U includes all even integers while V includes the odd integers: i.e. $u_1=1$, $u_2=3$, . . . and $v_1=2$, $v_2=4$ . . . ;

iii) U and V are disconnected sets of random integers; such an option may be of interest as it may more backward compatible with earlier versions of P2P clients.

iv) $P_i$ asks from $P_v$ and $P_u$ a DF (XOR) combination of the available blocks (i.e., a sort of re-encoding of DF blocks by other DF blocks);

any combination of the foregoing.

As indicated previously, while certain embodiments may adopt a link to the network topology, various embodiments may adopt a DF pseudo-random choice.

A rationale behind this latter option may lie in that, if the number of blocks N per piece is large enough (for example N>10 may already be a "good" number for diversity in swarms SW that count ~100 peers) the length of the whole DF sequence DFS makes it possible to assign a different DF section to each piece request without having to pay too much attention.

In embodiments of this kind, a link to the network topology (e.g., distance from the root) may no longer be necessary, while the request may play a role. Consequently, in various embodiments:

i) if requests of pieces are not monitored by a central tracker T:

a) the supplier SS may send the DF blocks from a section selected randomly from the whole DF sequence DFS;

b) the supplier SS may send DF blocks selected by picking them up randomly from the DF sequence DFS;

c) the supplier SS may send DF blocks each picked up from a different DF section selected randomly in the whole DF sequence DFS;

d) the relative index position of the DF block in the DF section may be incremented constantly but the DF section changes at each count;

e) an arbitrary index of section $I_s$ may be defined following a linear algebra rule Y=aX, i.e., the 1st block chosen from DF section (1), the $2^{nd}$ block chosen from DF section (3), the $3^{rd}$ block chosen from DF section (5), and so on, by following a more complex generic rule $Y=f(X)$;

f) the choice may be a function of, e.g., the ID of the peer that enters the network; the time spent by the same ID peer into the network; or the piece index in the file;

ii) if requests of pieces are monitored by a central tracker T:

the central tracker T may assign groups of DF sections for each potential supplier. Among each group of DF sections, suppliers can provide the DF blocks by following options like those just considered under (a), (b), (c), (d), (e) and (f) in the foregoing;

the same option (e) may be adopted, with the section index $I_s$ chosen by the tracker through various methods or formulas.

Various embodiments may adopt any feasible combination of the options and sub-options considered in the foregoing.

In exploiting the DF mechanism exemplified herein in order to distribute blocks in a (e.g., P2P) swarm, various embodiments may provide for encoded blocks being shared early throughout the network.

Both delivery approaches discussed previously may prevent peers from selecting the same DF section and various embodiments may take care of successfully forwarding packets without generating duplicate DF blocks, so that the advantages of the embodiments may be exploited.

For instance, in scenarios where a reasonable confidence exists that every peer will encode its own pieces using a unique seed for the DF block generator, forwarding blocks as soon as a peer receives them may enhance data distribution and minimize the startup time of the system as a whole.

Figure 22:
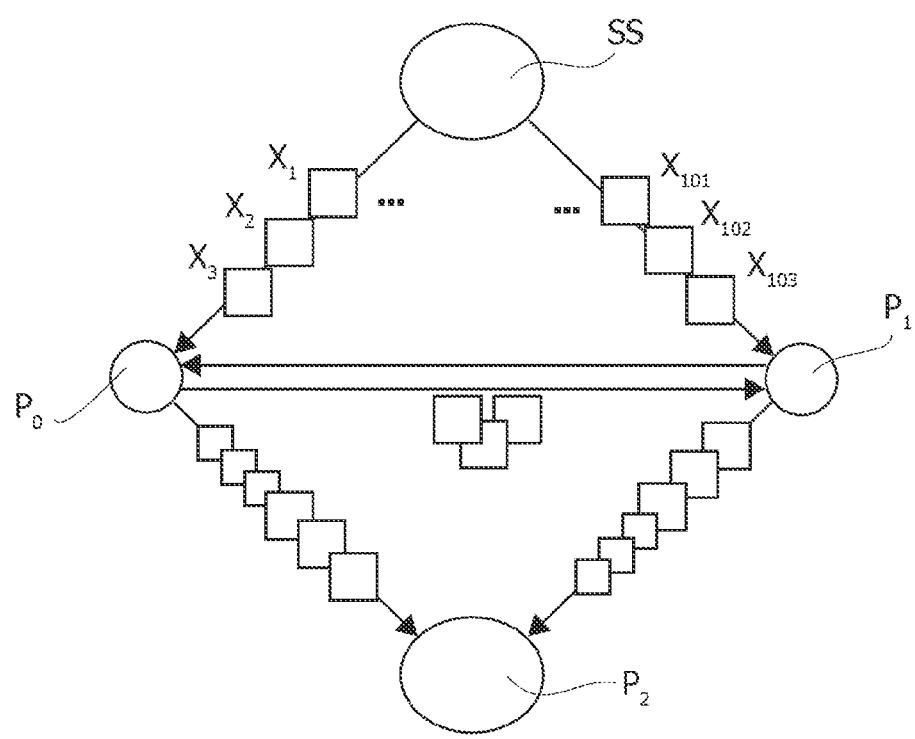
FIGS. 22, 23, and 24 are exemplary of block forwarding in cooperative networks.

In certain contingencies, the mesh topology of a swarm SW may involve the presence of loops: FIG. 22 schematically represents an exemplary case where data duplication may occur. There, $P_0$ and $P_1$ are shown to collect encoded DF blocks from a seed supplier SS and forward them to any other peer they are in contact with (e.g., $P_2$). Being unaware that they share a common peer SS, they may both blindly forward their collected blocks to, say, $P_2$, thus sending the same information twice and wasting resources that could find better use. Continuing the forwarding scheme, $P_2$ could in turn mirror the blocks back to $P_0$ and $P_1$ (as they may appear both as potential peers in need of blocks to complete a piece), creating a dangerous loop that could easily lead the system to a halt. Even if a tree structure is adopted, such a peer topology may arise when its "leaves" decide to exchange received data.

In various embodiments, such a situation may be countered by using any of the exemplary forwarding schemes considered and by adopting various approaches to deal with duplicate blocks.

For instance, various embodiments may adopt a "forwarding halt" approach, where duplicate DF blocks are dealt with locally: as soon as a peer discovers that duplicate data is circulating in the swarm passing through its endpoints (i.e., that duplicate block data are being propagated there through), it will stop the forwarding process, effectively breaking the loop. This may be achieved by keeping track of the received DF section information associated with each packet, without undermining the back-compatibility to previous versions of BF/BT clients and without adding overhead to the DF block payload. Since that exemplary scheme may be applied once that data is received, there may still some duplicate DF blocks traversing the mesh, with their presence detected and controlled by each peer. In the example shown, $P_2$ may still receive duplicate data from $P_0$ and $P_1$, but it will not forward data back to them or to any other peer connected to it.

Figure 23:
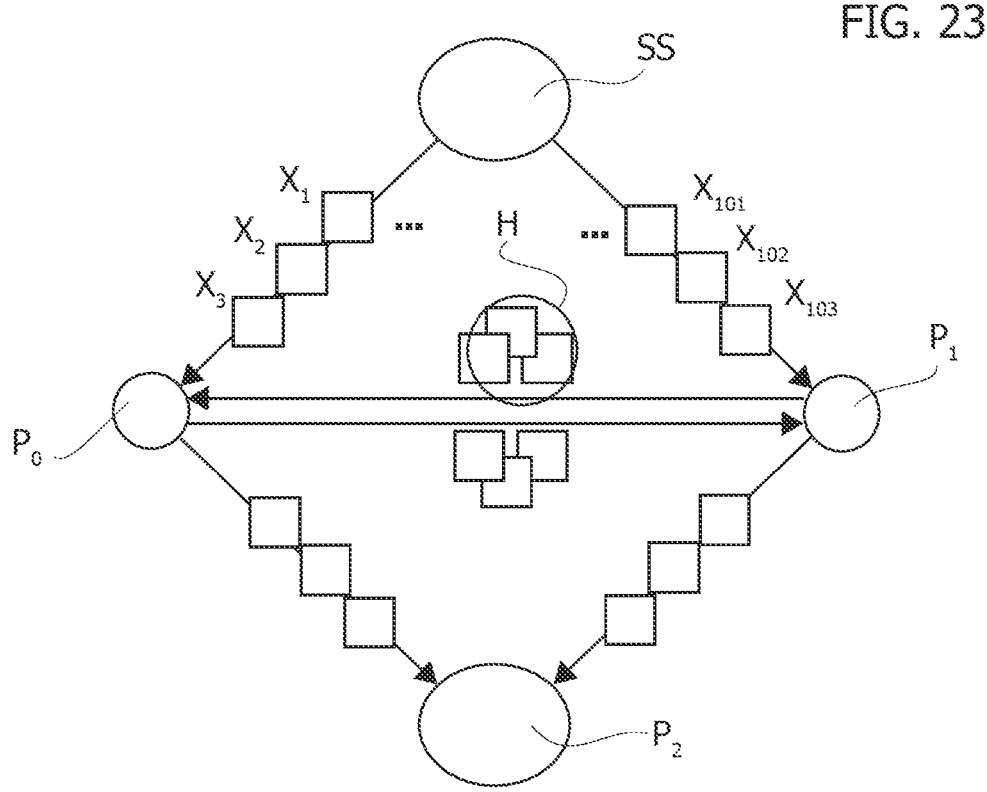

FIG. 23 is schematically representative of a "receiver list passing" approach, where the possibility of sending duplicate data is countered in the first place by creating a distributed rule set ensuring that each peer will not waste resources. In one possible approach, every encoded DF block may include an additional header (Forwarding control field) H with a list of peers towards which a sender may wish to forward data: in that way, the receiver will be able to check if a connected peer has already taken advantage of the forwarding scheme and will not push useless data towards the swarm.

In the exemplary case of FIG. 23, when $P_1$ forwards the blocks received from the seed to $P_0$ and $P_2$, it also adds their ID in the forwarding control field of the block. When $P_0$ receives the blocks, it already knows what peer(s) is/are to be excluded from the forwarding process. The additional header H gives the opportunity of avoiding the creation of duplicate data from the source, while making backward compatibility with previous versions of the protocol less immediate.

Figure 24:
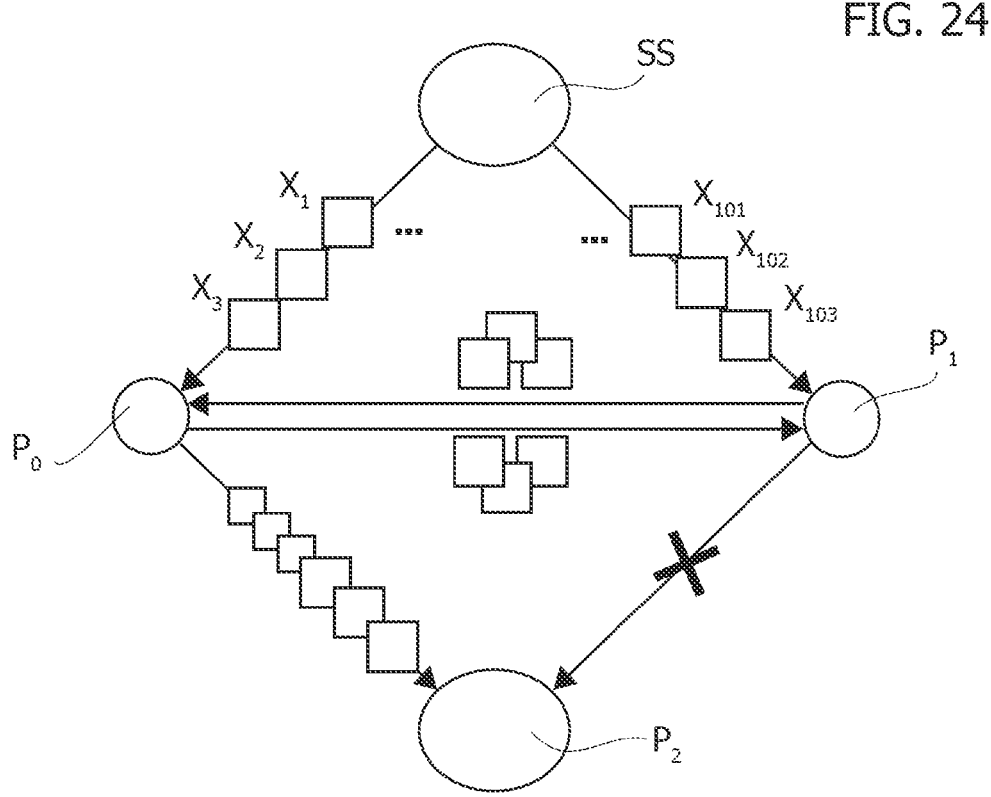

FIG. 24 is schematically representative of a "spanning tree" approach that is a sort of a mixed approach between the two approaches considered previously: instead of accepting duplicate data or avoiding it, various embodiments may regulate the flow of forwarded data on the mesh links in a spanning-tree fashion. A peer detecting duplicate data may choose a favorite supplier from which to receive data and notify the other peers with a signaling packet so that these may avoid supplying redundant blocks through specific links. In that way, an underlying tree topology is created between peers, and forwarding can proceed according to a push model. The criteria used to select a particular peer as the block supplier may, e.g., be similar to those described previously for establishing a link to the network topology. Using this forwarding scheme, some duplicate data may at first be present on the mesh, until the underlying tree topology is established: once this happens, the following blocks will be distributed without further waste of resources. To better cope with peer churn, various embodiments may introduce a weighting factor on each disabled link in order to prevent the exclusion of peers from the swarm.

For instance, in various embodiments, as exemplified in FIG. 24, as soon as $P_2$ receives a duplicate block from $P_0$ or $P_1$, it can notify $P_1$, and ask $P_1$ to stop forwarding further data. The link between $P_2$ and $P_1$ will be virtually removed from the mesh and the following blocks supplied by the seed will reach $P_2$ by passing only through $P_0$.

FIG. 25 is generally representative of various embodiments wherein information content arranged in pieces including blocks of bits is distributed over a network including plural nodes/terminals SS, $P_0$, $P_1$, $P_2$, $P_3$, $P_4$, . . . at least one of which (i.e., SS) acts as a "seed supplier," i.e., a source of the pieces of information distributed. Plural seed nodes may exist as shown in FIG. 18.

Due to the "cooperative" nature of the network (e.g., P2P), terminals may be configured to act as peer terminals with at least one first peer terminal (e.g., $P_1$ or $P_2$) sending the information to at least one second peer terminal (e.g., $P_4$). Various embodiments may provide receiving at the first peer terminal a set of blocks B of a corresponding piece of information (PE, from SS) and reconstructing the corresponding piece of information from the set of blocks received. The pieces of information distributed over the network are fountain encoded (see, e.g., 100 in FIGS. 11 and 12) by XOR-ing the blocks in a piece, whereby a received piece is reconstructable (see, e.g., DFM in FIGS. 9 and 10) from a combination of a corresponding set of linearly independent XOR-ed blocks (e.g., $X_1$, $X_2$, $X_3$, . . . ). In various embodiments, the first peer terminal (e.g., $P_1$ or $P_2$) may start sending to the at least one second peer terminal (e.g., $P_4$) blocks from the set of blocks B it is receiving before the corresponding piece of information becomes reconstructable at the first peer terminal from said set of blocks, that is, before the whole set of blocks corresponding to the piece is received and the piece reconstructed and possibly subjected to an integrity check, such as, e.g., a hash integrity check at the first peer terminal. Fountain encoding the pieces of information distributed over the network may be by means of plural sets of linearly independent XOR-ed blocks (see, e.g., DF1, DF2, DF3, . . . in FIG. 12) so that a same piece of information may be distributed to a plurality of peer terminals (e.g., from SS to $P_1$ or $P_2$ in FIG. 25) by sending to the peer terminals in the plurality different sets of linearly independent XOR-ed blocks (see, e.g., $X_{101}$, $X_{102}$, $X_{103}$ sent to $P_1$ and $X_{201}$, $X_{202}$, $X_{203}$ sent to $P_2$), thus avoiding undue redundancy in the information further propagated to other peers, such as, e.g., $P_4$ in FIG. 25, which receives different DF blocks $X_{1101}$, $X_{1102}$, $X_{1103}$ from $P_1$ and $X_{2001}$, $X_{2002}$, $X_{2003}$ from $P_2$, respectively.

The use of various embodiments may be detected by tracing packets using simple network freeware sniffers. While possibly relying on different technologies, various embodiments improve over the basic BitTorrent pattern, e.g., in terms of download time as measurable by a common stopwatch, by also detecting that the piece-integrity-check constraint has been broken. This may be by sniffing the traffic on a local machine running a BitFountain scheme with, e.g., popular free software (such as Ethereal, a freeware for Windows or Unix-Linux) for a few minutes and detecting that blocks are shared to other IP addresses before a piece is completed. Also, in various embodiments, a number may indicate the index of the DF block in the whole DF sequence to specify the elements of the DF matrix that are set to one: i.e., what blocks have been XORed from the original source. Headers are exempt from encryption, which makes it possible to see how blocks are XORed. Additionally, changes over conventional solutions are accessible in the header, which is totally clear, not encrypted to the sniffer.

Various embodiments may be applied to Set Top Box technology while being otherwise adapted for other types of P2P content sharing.

Full working systems applied to file-sharing may use a Digital Fountain and a UDP and still be backward compatible with BitTorrent.

Performance evaluation of various embodiments shows superior performance in comparison to BitTorrent with increased piece size, leading to a possible improvement of more than 33% in download time. Such improved performance may be advantageous, e.g., in the area of Set Top Box technology (for P2P and content delivery engines) and, more generally, in encoding and data generation technology. Improved performance may be advantageous not just in P2P environments, but also in other scenarios of content delivery other than P2P.

Another field of use may be apps for smartphones: sports events, concerts, and any other events which may benefit from P2P technology in sharing MultiMedia (MM) contents related to an event attended by thousands of people.

Of course, without prejudice to the underlying principles of the disclosure, the details and the embodiments may vary, even appreciably, with respect to what has been described by way of example only, without departing from the scope of the disclosure.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. An apparatus, comprising a first network node configured to receive a block of information, the block of information being a part of a piece of information and the piece of information being part of a file content being distributed over a network including the first network node, the first network node configured to recover a portion of file content in response to the received block of information and configured to send the received block of information over the network to at least one second network node before the first network node recovers the portion of the content, and the first network node further configured to generate for a same source piece of information different sets of linearly independent XOR-ed blocks of information and to generate for the source piece of information a digital fountain sequence including a plurality of sections, each section including a different XOR combination of blocks of the source piece containing the information of the source piece, and the first network node further configured to send different sets of linearly independent XOR-ed blocks selected from the sections to the at least one second peer terminal, the section sent to each of the at least one second peer terminal being selected as a function of a position of the at least one second peer terminal in a topology of the network.

2. The apparatus of claim 1 wherein:
the content includes a file;
the portion of the content includes a piece of the file; and
the block of information corresponds to the piece of the file.

3. The apparatus of claim 1 wherein:
the content includes a file;
the portion of the content includes a piece of the file; and
the block of information includes one of multiple blocks of information that correspond to the piece of the file.

4. The apparatus of claim 1 wherein:
the content includes a file;
the portion of the content includes a piece of the file; and
the block of information includes a portion of the piece of the file.

5. The apparatus of claim 1 wherein:
the first network node is configured to send a request for the portion of the content over a network; and
the first network node is configured to receive the block of information over the network.

6. The apparatus of claim 1 wherein the first network node is configured to send the received block of information before the first network node has received a number of blocks of information, the number of blocks being sufficient for the first network node to recover the portion of the content.

7. The apparatus of claim 1, further comprising:
wherein the first network node is configured to receive other blocks of information that correspond to the portion of the content; and the first network node is configured to recover the portion of the content by exclusive-OR-ing groups of the received blocks to recover subportions of the portion of the content.

8. The apparatus of claim 1, wherein the first network node is further configured to encode the recovered portion of the content by exclusive-OR-ing blocks of the recovered portion to generate blocks of information that correspond to the recovered portion of the content.

9. The apparatus of claim 1 wherein the first network node is configured to send an indication of a destination of the sent block of information.

10. A non-transitory computer-readable medium storing instructions that, when executed by one or more computing apparatuses, cause at least one of the computing apparatuses, or at least one other apparatus under control of at least one of the computing apparatuses:
  to cause a first network node to receive a block of information, the block of information being a part of a piece of information and the piece of information being part of a file content being distributed over a network including the first network node;
  to cause the first network node to send the block of information to at least one second network node before the first network node recovers a portion of content based on the block of information, and before the first network node verifies the recovered portion of the content,
  to generate for a same source piece of information different sets of linearly independent XOR-ed blocks of information;
  to generate for the source piece of information a digital fountain sequence including a plurality of sections, each section including a different XOR combination of blocks of the source piece containing the information of the source piece;
  to send different sets of linearly independent XOR-ed blocks selected from the sections to the at least one second peer terminal; and
  to select the sections and the corresponding different sets of linearly independent XOR-ed blocks that are sent to each of the at least one second peer terminal as a function of a position of the at least one second peer terminal in a topology of the network.

11. A method of distributing information contents over a network including a first peer terminal and a second peer terminal, the method comprising:
  fountain encoding the information contents to be distributed over the network, the information contents being arranged in pieces of information with each piece of information including a plurality of blocks, the fountain encoding including XOR-ing the plurality of blocks in each piece of information to generate a plurality of linearly independent XOR-ed blocks of the piece of information, and each piece of information being reconstructable from a combination of a number of the corresponding linearly independent XOR-ed blocks, the fountain encoding each piece of information to be distributed over the network by means of plural sets of linearly independent XOR-ed blocks including,
    generating for the piece of information different sets of linearly independent XOR-ed blocks by:
      generating for the piece of information a digital fountain sequence including a plurality of sections, each of the plurality of sections including, a different XOR combination of blocks of the piece of information; and
      distributing the same piece of information over the network to at least the first and second peer terminals by sending the XOR combination of blocks for a first one of the plurality of sections to the first peer terminal and the XOR combination of blocks for a different one of the plurality of sections to the second peer terminal, the sending including selecting the first one of the plurality of sections and the different one of the plurality of sections as a function of a position of the first and second peer terminals in a topology of the network;
  receiving sequentially at the first peer terminal the plurality of linearly independent XOR-ed blocks of a corresponding piece of information;
  reconstructing at the first peer terminal the corresponding piece of information from the received linearly independent XOR-ed blocks once the number of the corresponding linearly independent XOR-ed blocks has been received at the first peer terminal; and
  sending sequentially from the first peer terminal to the second peer terminal the received plurality of linearly independent XOR-ed blocks before the number of the corresponding linearly independent XOR-ed blocks has been received at the first peer terminal.

12. The method of claim 11, wherein fountain encoding the information contents to be distributed over the network comprises:
  fountain encoding a piece of information to be distributed over the network by means of plural sets of linearly independent XOR-ed blocks; and
  distributing the same piece of information over the network to at least the first and second peer terminals by sending to the first and second peer terminals different sets of the plural sets of linearly independent XOR-ed.

13. The method of claim 11, wherein reconstructing at the first peer terminal the corresponding piece of information from the received linearly independent XOR-ed blocks comprises performing an integrity check on the corresponding piece of information being reconstructed.

14. The non-transitory computer readable medium of claim 10, further storing instructions that, when executed by one or more computing apparatuses, cause at least one of the computing apparatuses, or at least one other apparatus under control of at least one of the computing apparatuses, to select the sections and corresponding different sets of linearly independent XOR-ed blocks that are sent to each of the at least one second peer terminal based upon at least one of a number of hops from a root of a tree structure of the network to the at least one second peer terminal or an index identifying the at least one second peer terminal in the network.

* * * * *